United States Patent
Sunde

(10) Patent No.: US 9,855,960 B2
(45) Date of Patent: Jan. 2, 2018

(54) BRAKING SYSTEMS FOR RAILWAY CARS

(71) Applicant: Amsted Rail-Faiveley LLC, Greenville, SC (US)

(72) Inventor: Jonathan Sunde, Greenville, SC (US)

(73) Assignee: Amsted Rail Company, Inc., Chicago, IL (US)

( * ) Notice: Subject to any disclaimer, the term of this patent is extended or adjusted under 35 U.S.C. 154(b) by 0 days.

(21) Appl. No.: 15/161,507

(22) Filed: May 23, 2016

(65) Prior Publication Data
US 2017/0334471 A1 Nov. 23, 2017

(51) Int. Cl.
- B60T 7/12 (2006.01)
- B61H 15/00 (2006.01)
- B61H 1/00 (2006.01)

(52) U.S. Cl.
CPC .......... B61H 15/0014 (2013.01); B61H 1/00 (2013.01)

(58) Field of Classification Search
CPC ...... B61H 15/0028; B61H 13/36; F16D 65/56
USPC ..................... 188/33, 52, 124, 153 R, 219.1
See application file for complete search history.

(56) References Cited

U.S. PATENT DOCUMENTS

| | | |
|---|---|---|
| 2,383,955 A | 9/1943 | Busse |
| 2,937,725 A | 5/1960 | Newell |
| 3,378,108 A | 4/1968 | McClure et al. |
| 3,412,830 A | 11/1968 | Bushnell |
| 3,499,507 A | 3/1970 | Scott et al. |
| 3,737,012 A | 6/1973 | Haydu |
| 4,258,830 A | 3/1981 | Pearson et al. |
| 4,593,797 A | 6/1986 | Schmitt |
| 4,613,016 A | 9/1986 | Hart et al. |
| 4,646,882 A | 3/1987 | Holloway et al. |
| 4,662,485 A | 5/1987 | Kanjo et al. |
| RE32,729 E | 8/1988 | Schmitt |
| 4,771,868 A | 9/1988 | Haydu |

(Continued)

FOREIGN PATENT DOCUMENTS

| | | |
|---|---|---|
| EP | 1074450 A2 | 2/2001 |
| EP | 1428739 A1 | 6/2004 |

(Continued)

OTHER PUBLICATIONS

Amsted Rail-Faiveley LLC, International Patent Application No. PCT/US2016/017094; International Search Report; dated Apr. 11, 2016; 2 pages.

(Continued)

*Primary Examiner* — Christopher Schwartz
(74) *Attorney, Agent, or Firm* — Dority & Manning, P.A.

(57) ABSTRACT

Braking systems for railway cars are provided. A braking system defines a longitudinal axis, and includes a first brake assembly, a second brake assembly, and an actuator operable to generate a linear force, the actuator disposed proximate the second brake assembly. The braking system further includes a movable rod and a fixed rod extending between the first brake assembly and the second brake assembly. In some embodiments, the braking system further includes a dead lever and a slack adjuster disposed proximate the first brake assembly, the slack adjuster connected to the first brake assembly and the dead lever and operable to adjust a distance along the longitudinal axis between a reference point of the first brake assembly and a pivot point of the dead lever.

18 Claims, 19 Drawing Sheets

(56) References Cited

U.S. PATENT DOCUMENTS

| | | |
|---|---|---|
| 4,793,446 A | 12/1988 | Hart et al. |
| 4,830,148 A | 5/1989 | Hart et al. |
| 5,000,298 A | 3/1991 | Jackson et al. |
| 5,069,312 A | 12/1991 | Kanjo et al. |
| 5,259,485 A | 11/1993 | Jackson |
| 5,400,874 A | 3/1995 | Gayfer et al. |
| 5,456,337 A | 10/1995 | Jackson |
| 5,495,921 A | 3/1996 | Samulak et al. |
| 5,785,159 A | 7/1998 | Jackson et al. |
| 5,810,124 A | 9/1998 | Sandmann |
| 6,116,385 A | 9/2000 | Ring |
| 6,148,966 A | 11/2000 | Daugherty, Jr. et al. |
| 6,241,057 B1 | 6/2001 | Hiatt |
| 6,279,696 B1 | 8/2001 | Daugherty, Jr. et al. |
| 6,378,668 B1 | 4/2002 | Zemyan |
| 6,397,979 B1 | 6/2002 | Samulak et al. |
| 6,443,270 B1 | 9/2002 | Hodge |
| 6,702,073 B2 | 3/2004 | Sommerfeld |
| 6,971,488 B1 | 12/2005 | Ring et al. |
| 7,216,940 B2 | 5/2007 | Sommerfeld |
| 7,341,128 B2 | 3/2008 | Ring et al. |
| 7,472,775 B2 | 1/2009 | Tuten |
| 7,527,131 B1 | 5/2009 | Wike |
| 7,802,662 B2 | 9/2010 | Sommerfeld et al. |
| 7,931,130 B2 * | 4/2011 | Ring ...................... B61H 13/24 188/124 |
| 9,511,782 B2 * | 12/2016 | Sunde ................ B61H 15/0028 |
| 2004/0190979 A1 | 9/2004 | De La Fuente-Farias |
| 2006/0219502 A1 | 10/2006 | De La Fuente-Farias |
| 2007/0023241 A1 | 2/2007 | Ring |
| 2007/0209886 A1 | 9/2007 | Tuten |
| 2008/0035432 A1 | 2/2008 | Ring et al. |
| 2011/0147140 A1 * | 6/2011 | Ring ...................... B61H 13/24 188/124 |
| 2011/0253492 A1 | 10/2011 | De La Fuente Farias |
| 2013/0118845 A1 | 5/2013 | De La Fuente Farias |
| 2014/0174318 A1 | 6/2014 | Reese et al. |
| 2015/0014102 A1 * | 1/2015 | Koziol ..................... B61H 1/00 188/52 |
| 2015/0321681 A1 | 11/2015 | Sunde |

FOREIGN PATENT DOCUMENTS

| | | |
|---|---|---|
| WO | WO2007/0008512 A1 | 1/2007 |
| WO | WO2004/089717 A1 | 10/2014 |
| WO | WO2014/200974 A1 | 12/2014 |
| WO | WO2016/0130512 A1 | 8/2016 |
| WO | WO2016/0130513 A1 | 8/2016 |

OTHER PUBLICATIONS

Amsted Rail-Faiveley LLC, International Patent Application No. PCT/US2016/017097; International Search Report; dated Apr. 14, 2016 (2 pages).

Amsted Rail-Faiveley LLC; PowerPoint Presentation; Dec. 16, 2015 (17 pages).

Amsted Rail Company, Inc, International Patent Application No. PCT/US2017/033068; International Search Report; dated Oct. 18, 2017; 2 pages.

\* cited by examiner

BRAKING SYSTEMS FOR RAILWAY CARS

FIELD OF THE INVENTION

The present invention relates generally to braking systems for railway car, and more particularly to improved slack adjusters, struts assemblies, and brake assemblies for railway car braking systems.

BACKGROUND OF THE INVENTION

Railway cars are widely used for transportation of goods and passengers throughout the United States and abroad. Railway cars generally include one or more truck assemblies including a plurality of specially designed wheels for traveling along a vast infrastructure of railway tracks. Braking systems are generally disposed between adjacent pairs of wheels for facilitating the stopping or slowing down of the railway car.

A braking system can generally include front and rear brake assemblies, each including a pair of brake heads with brake pads for contact with an outer periphery of the wheels when the front and rear brake assemblies are moved away from one another. Commonly, an air cylinder is provided in the braking system for generating the force that causes such movement. The air cylinder or another actuator causes movement of a linkage system which is connected to and causes movement of the front and rear brake assemblies.

Many braking systems further include assemblies conventionally known as slack adjusters for adjusting the movement of the front and rear brake assemblies as required. In particular, slack adjusters compensate for brake pad wear by adjusting the movement of the front and rear brake assemblies based on changes in the distance that the brake heads must travel to contact the wheels. Typically, a slack adjuster is built into one of the rods in the linkage system. For example, such linkage systems can include two movable rods, one of which can include a slack adjuster, and two movable levers.

Improvements in slack adjuster and brake assembly design generally are, however, desired in the art. For example, improvements in the force transmission capabilities, robustness, and overall weight of brake assembly designs are generally desired.

BRIEF DESCRIPTION OF THE INVENTION

Aspects and advantages of the invention are set forth below in the following description, or may be obvious from the description, or may be learned through practice of the invention.

In accordance with one embodiment of the present disclosure, a braking system for a railway car is provided. The braking system defines a longitudinal axis, and includes a first brake assembly and a second brake assembly. The first brake assembly and the second brake assembly each include a bar assembly and a plurality of brake heads connected to the bar assembly. The bar assembly of the first brake assembly defines a reference point. The braking system further includes an actuator operable to generate a linear force, the actuator disposed proximate the second brake assembly. The braking system further includes a fixed rod extending between the first brake assembly and the second brake assembly, the fixed rod coupled to the actuator, and a movable rod extending between the first brake assembly and the second brake assembly, the movable rod translatable along the longitudinal axis based on operation of the actuator. The braking system further includes a live lever disposed proximate the second brake assembly, the live lever including a first end, a second end, and a pivot point between the first end and the second end, the first end connected to the actuator, the second end connected to the movable rod. The braking system further includes a dead lever disposed proximate the first brake assembly, the dead lever including a first end, a second end, and a pivot point between the first end and the second end, the first end connected to the movable rod, the second end connected to the fixed rod. The braking system further includes a slack adjuster disposed proximate the first brake assembly, the slack adjuster connected to the first brake assembly and the dead lever and operable to adjust a distance along the longitudinal axis between the reference point and the pivot point of the dead lever.

In accordance with another embodiment of the present disclosure, a braking system for a railway car is provided. The braking system defines a longitudinal axis. The braking system includes a first brake assembly, the first brake assembly including a bar assembly and a plurality of brake heads connected to the bar assembly, the bar assembly including a tension bar assembly and a compression bar, and wherein a reference point is defined on the tension bar at a central point along a transverse axis. The braking system further includes a second brake assembly, the second brake assembly including a bar assembly and a plurality of brake heads connected to the bar assembly, the bar assembly including a tension bar assembly and a compression bar. The braking system further includes an actuator operable to generate a linear force, the actuator disposed between the tension bar assembly and the compression bar of the second brake assembly. The braking system further includes a fixed rod extending between the first brake assembly and the second brake assembly, the fixed rod coupled to the actuator, and a movable rod extending between the first brake assembly and the second brake assembly, the movable rod coupled to the actuator and translatable along the longitudinal axis based on operation of the actuator. The braking system further includes a live lever disposed between the tension bar assembly and the compression bar of the second brake assembly, the live lever including a first end, a second end, and a pivot point between the first end and the second end, the first end connected to the actuator, the second end connected to the movable rod. The braking system further includes a dead lever disposed between the tension bar assembly and the compression bar of the first brake assembly, the dead lever including a first end, a second end, and a pivot point between the first end and the second end, the first end connected to the movable rod, the second end connected to the fixed rod. The braking system further includes a slack adjuster disposed between the tension bar assembly and the compression bar of the first brake assembly, the slack adjuster connected to the tension bar assembly of the first brake assembly and the dead lever and operable to adjust a distance along the longitudinal axis between the reference point and the pivot point of the dead lever. Rotation of the first end of the dead lever about the pivot point of the dead lever within a first angle range causes no adjustment of the distance along the longitudinal axis between the reference point and the pivot point and rotation of the first end of the dead lever about the pivot point of the dead lever within a second angle range different from the first angle range causes adjustment of the distance along the longitudinal axis between the reference point and the pivot point.

In accordance with another embodiment of the present disclosure, a braking system for a railway car is provided.

The braking system defines a longitudinal axis. The braking system includes a first brake assembly, the first brake assembly including a bar assembly and a plurality of brake heads connected to the bar assembly, the bar assembly including a tension bar assembly and a compression bar. The bar assembly further includes a second brake assembly, the second brake assembly including a bar assembly and a plurality of brake heads connected to the bar assembly, the bar assembly including a tension bar assembly and a compression bar. The bar assembly further includes an actuator operable to generate a linear force, the actuator disposed between the tension bar assembly and the compression bar of the second brake assembly. The bar assembly further includes a fixed rod extending between the first brake assembly and the second brake assembly, and a movable rod extending between the first brake assembly and the second brake assembly, the movable rod connected to the actuator and translatable along the longitudinal axis based on operation of the actuator. The bar assembly further includes a live lever disposed proximate the second brake assembly, the live lever including a first end, a second end, and a pivot point between the first end and the second end, the first end connected to the actuator, the second end connected to the movable rod. The bar assembly further includes a strut assembly disposed between and connected to the tension bar assembly and the compression bar of the second brake assembly, wherein the pivot point of the live lever is coupled to the strut assembly.

In accordance with another embodiment of the present disclosure, a braking system for a railway car is provided. The braking system defines a longitudinal axis. The braking system includes a first brake assembly, the first brake assembly including a bar assembly and a plurality of brake heads connected to the bar assembly, the bar assembly including a tension bar assembly and a compression bar, the tension bar assembly comprises a first tension bar and a second tension bar spaced apart from the first tension bar along a vertical axis. The braking system further includes a second brake assembly, the second brake assembly including a bar assembly and a plurality of brake heads connected to the bar assembly, the bar assembly including a tension bar assembly and a compression bar, the tension bar assembly including a first tension bar and a second tension bar spaced apart from the first tension bar along the vertical axis. The braking system further includes an actuator operable to generate a linear force, the actuator disposed between the tension bar assembly and the compression bar of the second brake assembly. The braking system further includes a fixed rod extending between the first brake assembly and the second brake assembly, and a movable rod extending between the first brake assembly and the second brake assembly, the movable rod connected to the actuator and translatable along the longitudinal axis based on operation of the actuator. The braking system further includes a live lever disposed proximate the second brake assembly, the live lever including a first end, a second end, and a pivot point between the first end and the second end, the first end connected to the actuator, the second end connected to the movable rod. The braking system further includes a strut assembly disposed between and connected to the tension bar assembly and the compression bar of the second brake assembly, the strut assembly including a first strut member and a second strut member, the second strut member spaced from the first strut member along the vertical axis, wherein the pivot point of the live lever is coupled to the first strut member and the second strut member, and wherein the live lever is disposed between the first strut member and the second strut member along the vertical axis.

In accordance with another embodiment of the present disclosure, a braking system for a railway car is provided. The braking system defines a longitudinal axis. The braking system includes a first brake assembly, the first brake assembly including a bar assembly, a plurality of brake heads connected to the bar assembly, and a plurality of end extensions connected to the bar assembly, the bar assembly including a tension bar assembly and a compression bar. The braking system further includes a second brake assembly, the second brake assembly including a bar assembly, a plurality of brake heads connected to the bar assembly, and a plurality of end extensions connected to the bar assembly, the bar assembly including a tension bar assembly and a compression bar. The braking system further includes an actuator operable to generate a linear force, the actuator disposed between the tension bar assembly and the compression bar of the second brake assembly. The braking system further includes a fixed rod extending between the first brake assembly and the second brake assembly, and a movable rod extending between the first brake assembly and the second brake assembly, the movable rod connected to the actuator and translatable along the longitudinal axis based on operation of the actuator. The braking system further includes a live lever disposed proximate the second brake assembly, the live lever including a first end, a second end, and a pivot point between the first end and the second end, the first end connected to the actuator, the second end connected to the movable rod.

In accordance with another embodiment of the present disclosure, a braking system for a railway car is provided. The braking system defines a longitudinal axis. The braking system includes a first brake assembly, the first brake assembly including a bar assembly, a plurality of brake heads connected to the bar assembly, and a plurality of end extensions connected to the bar assembly, the bar assembly including a tension bar assembly and a compression bar. The braking system further includes a second brake assembly, the second brake assembly including a bar assembly, a plurality of brake heads connected to the bar assembly, and a plurality of end extensions connected to the bar assembly, the bar assembly including a tension bar assembly and a compression bar. The braking system further includes an actuator operable to generate a linear force, the actuator disposed between the tension bar assembly and the compression bar of the second brake assembly. The braking system further includes a fixed rod extending between the first brake assembly and the second brake assembly, and a movable rod extending between the first brake assembly and the second brake assembly, the movable rod connected to the actuator and translatable along the longitudinal axis based on operation of the actuator. The braking system further includes a live lever disposed proximate the second brake assembly, the live lever including a first end, a second end, and a pivot point between the first end and the second end, the first end connected to the actuator, the second end connected to the movable rod. Each of the plurality of end extensions of the first brake assembly and the second brake assembly includes a connector body and a support body extending from the connector body. The support body of each of the plurality of end extensions of the first brake assembly and the second brake assembly is offset from a midpoint of the associated bar assembly along a vertical axis, and each of the plurality of brake heads is offset from a midpoint of the associated bar assembly along the vertical axis.

Those of skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
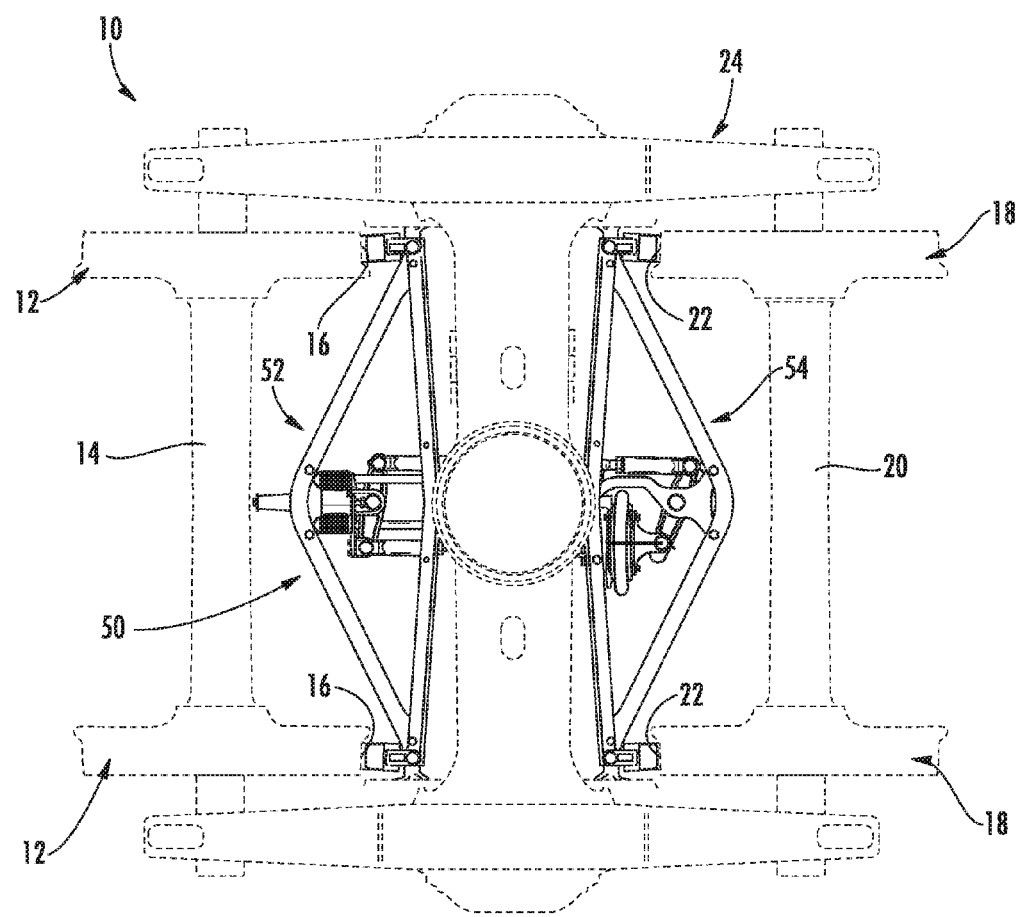
FIG. 1 is an overhead view of portions of an exemplary railway car truck (shown in phantom) having a braking system in accordance with one embodiment of the present disclosure installed therein.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. Similarly, the terms "front" and "rear" may be used to describe certain components relative to one another, it being understood that the orientation of the components may be reversed depending for example on a traveling direction of the railway car. Further, the term "longitudinally" may for example refer to the relative direction substantially parallel to the traveling direction of a railway car, and "transverse" may refer for example to the relative direction substantially perpendicular to the traveling direction of the railway car.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring now to the figures, FIG. 1 provides a braking system 50 in accordance with an exemplary embodiment of the present disclosure, installed in an exemplary railway car truck 10 (shown in phantom). The railway car truck depicted in FIG. 1 generally includes a first axle 14 and a second axle 20, connected and supported by a chassis 24. The first axle 14 includes a pair of first wheels 12 rotatably mounted thereto and similarly, the second axle 20 includes a pair of second wheels 18 rotatably mounted thereto. The chassis 24 may support a portion of a railway car (not shown) and allow the truck 10 and railway car, using the first and second wheels 12, 18, to roll along a corresponding infrastructure of railway car tracks (not shown).

As will be discussed in greater detail below, the railway car truck 10 further includes an exemplary braking system 50, including a first brake assembly 52 and a second brake assembly 54, spaced from one another along a longitudinal axis L (see FIGS. 2-4). As shown, a transverse axis T and vertical axis V are additionally defined. The axes L, T, V are mutually orthogonal. In certain exemplary embodiments, the first brake assembly 52 may correspond to a front brake assembly and the second brake assembly 54 may correspond to a rear brake assembly. Similarly, in certain exemplary embodiments, the first and second axles 14, 20 of the truck 10 may correspond to front and rear axles, and the first and second wheels 12, 18 may correspond to front and rear wheels. The braking system 50 is configured to generate friction between an outer periphery 16, 22 of the first and second wheels 12, 18, respectively, to slow and/or stop the railway car truck 10.

Figure 2:
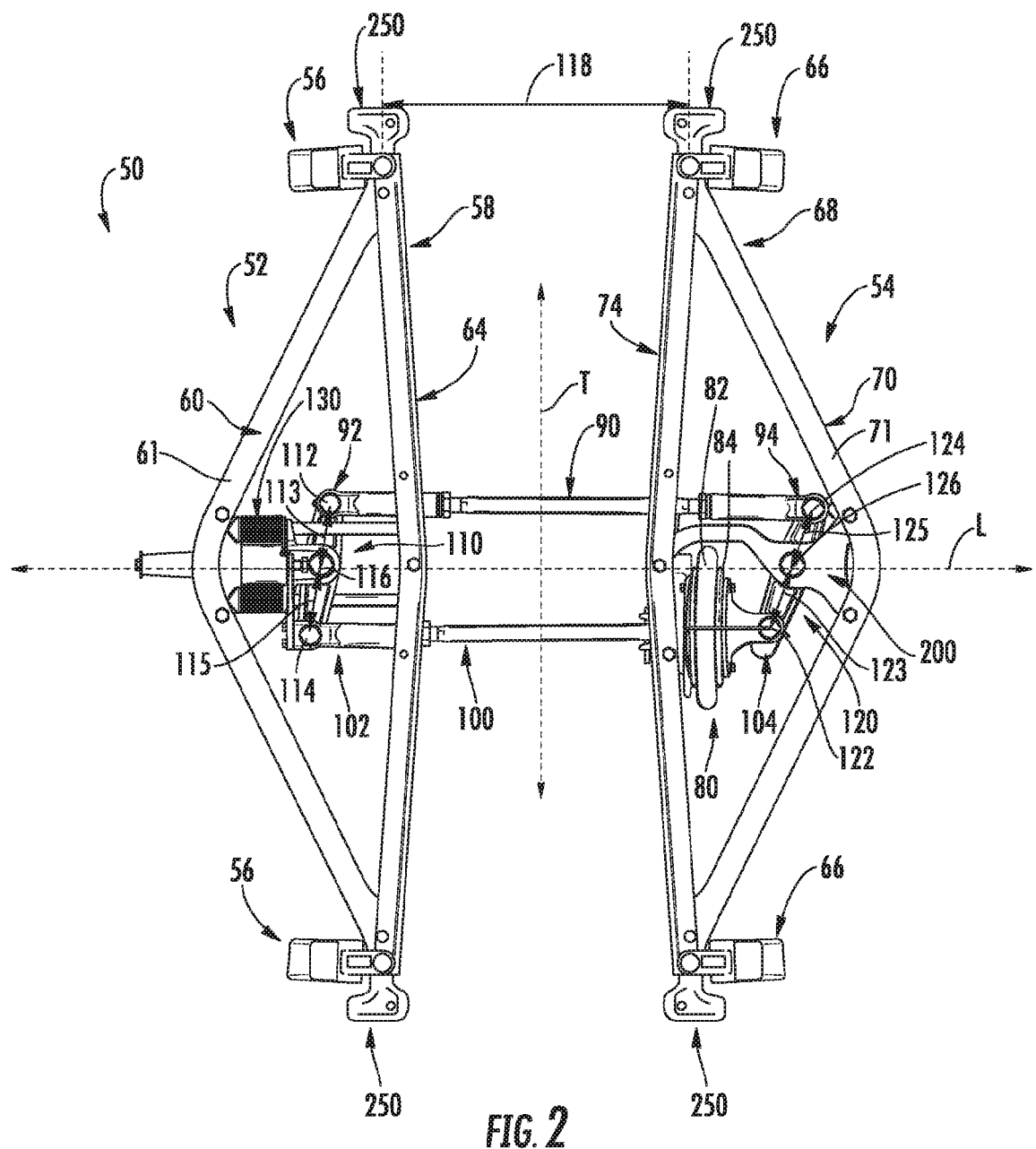
FIG. 2 is an overhead view of the exemplary braking system depicted in FIG. 1 in an non-deployed position.
Figure 3:
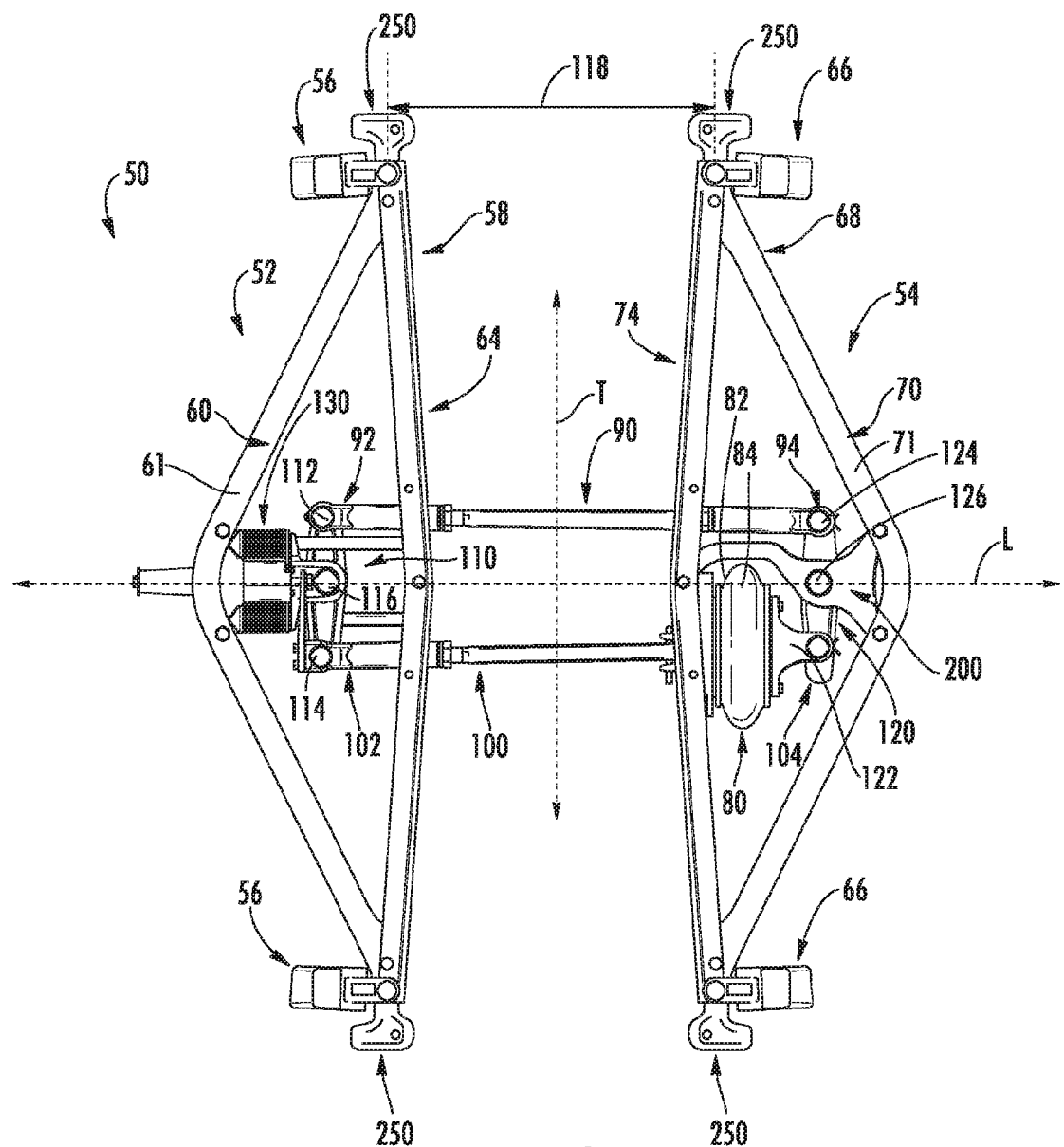
FIG. 3 is an overhead view of the exemplary braking system depicted in FIG. 1 in a deployed position with a slack adjuster of the braking system not actuated.
Figure 4:
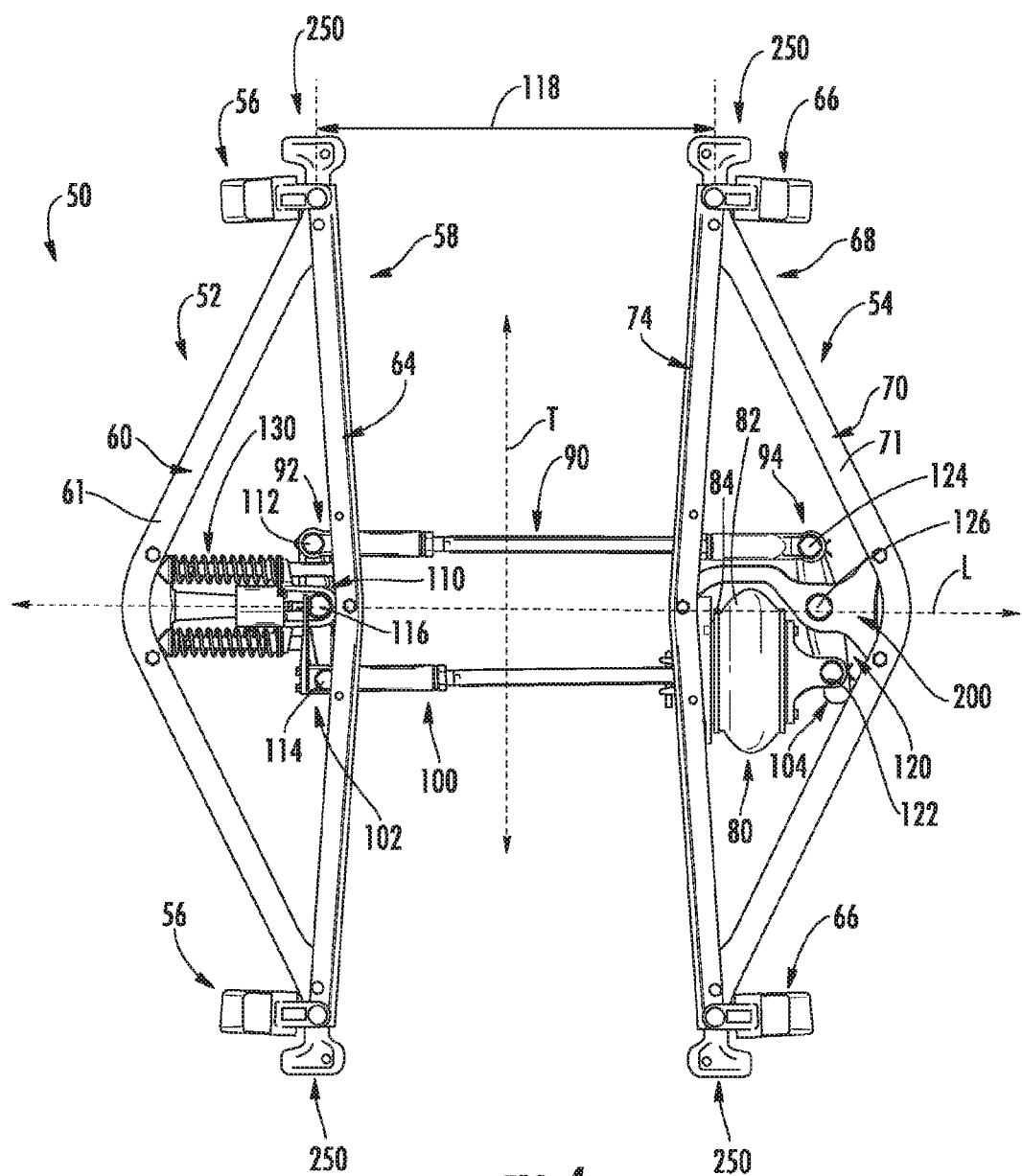
FIG. 4 is an overhead view of the exemplary braking system depicted in FIG. 1 in a deployed position after actuation of a slack adjuster of the braking system.

Referring now to FIGS. 2-4, the exemplary braking system 50 of FIG. 1 will be described in greater detail. The first brake assembly 52 includes a plurality of brake heads 56, such as a pair of brake heads 56 as shown, disposed at transverse ends (along transverse axis T) of the first brake assembly 52. The brake heads 56 each include one or more brake pads (not shown) defining a thickness and configured to contact an outer periphery 16 of the first wheels 12 (see FIG. 1). First brake assembly 52 further includes a bar assembly 58, which can for example include a tension bar assembly 60 and a compression bar 64 each extending between the brake heads 56.

In exemplary embodiments as shown, tension bar assembly 60 may include a first tension bar 61 and a second tension bar 62. The second tension bar 62 may be spaced apart from the first tension bar 61 along the vertical axis V. As shown, no intermediate bars or members may directly connect the first and second tension bars 61, 62. In exemplary embodiments, the first and second tension bars 61, 62 may be generally flat bar members, as shown.

The compression bar 64, on the other hand, in exemplary embodiments may be formed from, for example, a C-channel member or other suitable bar.

As with the first brake assembly 52, the second brake assembly 54 similarly includes a plurality of brake heads 66, such as a pair of brake heads 66 as shown, disposed at transverse ends of the second brake assembly 54, each with one or more brake pads (not shown) defining a thickness and configured to contact an outer periphery 22 of the second wheels 18. Second brake assembly 54 further includes a bar assembly 68, which can for example include a tension bar assembly 70 and a compression bar 74 each extending between the brake heads 66.

In exemplary embodiments as shown, tension bar assembly 70 may include a first tension bar 71 and a second tension bar 72. The second tension bar 72 may be spaced apart from the first tension bar 71 along the vertical axis V. As shown, no intermediate bars or members may directly connect the first and second tension bars 71, 72. In exemplary embodiments, the first and second tension bars 71, 72 may be generally flat bar members, as shown.

The compression bar 74, on the other hand, in exemplary embodiments may be formed from, for example, a C-channel member or other suitable bar.

One having skill in the art will appreciate, however, that in other exemplary embodiments, the braking system 50 may have any other suitable configuration of first and second brake assemblies 52, 54. For example, in other exemplary embodiments, the brake heads 56, 66 may have any other suitable construction and may include any suitable number of brake pads. In still other embodiments, the brake assemblies 52, 54 may not include both the tension bar assemblies and/or compression bars, and additionally, or alternatively, may include any other suitable bar members and/or configurations of structural components.

Referring still to FIGS. 2-4, the braking system 50 slows and/or stops the railway car truck 10 (see FIG. 1) by applying a divergent braking force between and to the first and second brake assemblies 52, 54, or more particularly, through the brake assemblies 52, 54 to the respective brake heads 56, 66 and brake pads. For the exemplary braking system 50 depicted in FIGS. 2-4, this force originates with an actuator 80 which, when actuated, provides a force which is transmitted to and through the first and second brake assemblies 52, 54. In general, actuator 80 is operable to generate a linear force which is transmitted to and through the first and second brake assemblies 52, 54. As illustrated, the linear force may be generated along the longitudinal axis L. In exemplary embodiments, as illustrated, the actuator 80 may be an inflatable air bag. Alternatively, however, the actuator 80 may be a brake cylinder, such as an air powered cylinder, hydraulic cylinder, or electric cylinder, or any other suitable actuator capable of generating a linear force.

Notably, in embodiments wherein the actuator 80 is an air bag, the actuator 80 can include a bladder 82 which is generally inflated and deflated when actuated as desired. The bladder 82 can be positioned between opposing plates 84, as shown, or rings. The plates 84 or rings are generally the components of the air bag that are connected to other components of the braking system 50 as discussed herein.

Actuator 80 may be disposed proximate the second brake assembly 54. For example, in exemplary embodiments as discussed, second brake assembly 54 may include a compression bar 74 and a tension bar assembly 70. Actuator 80 may be disposed within the second brake assembly 54, such as in these embodiments between the compression bar 74 and the tension bar assembly 70.

To facilitate transmission of the linear force generated by the actuator 80 to the brake assemblies 52, 54, a movable rod 90 may extend between the first and second brake assemblies 52, 54, such as along the longitudinal axis L. Movable rod 90 may be a rigid rod, formed for example from a suitable metal or other suitable material, which extends between a first end 92 and a second end 94. The movable rod 90, such as the second end 94 thereof, may be coupled to the actuator 80. For example, the movable rod 90 may be indirectly connected to the actuator 80 via a live lever as discussed herein. Accordingly, the movable rod 90 may be translatable along the longitudinal axis L based on operation of the actuator 80. Actuation of the actuator 80 thus causes translation of the movable rod 90 along the longitudinal axis L.

In some embodiments, the movable rod 90 may for example be formed form a single component and/or have a non-adjustable length (i.e. maximum length between the first end 92 and second end 94). Alternatively as shown, the movable rod 90 may be formed from multiple components and/or have an adjustable length. For example, in exemplary embodiments as shown, the movable rod 90 may be or include a turnbuckle. The turnbuckle may include an intermediate portion and end portions which may be connected via threaded interfaces. Rotation of the intermediate portion relative to the end portions or the end portions relative to the intermediate portions may cause adjustment to the length of the rod 90.

To further facilitate transmission of the linear force generated by the actuator 80 to the brake assemblies 52, 54, braking system 50 may further include a fixed rod 100. Similar to the movable rod 90, fixed rod 100 may extend between the first and second brake assemblies 52, 54, such as along the longitudinal axis L. Fixed rod 90 may be a rigid rod, formed for example from a suitable metal or other suitable material, which extends between a first end 102 and a second end 104. Fixed rod 100 may further be spaced apart from movable rod 90, such as along transverse axis T. For example, fixed rod 100 and movable rod 90 may be positioned on opposite sides of a centerline of the braking system 50 defined by the longitudinal axis L. Notably, fixed rod 100 may remain generally stationary, and not translate, rotate, or otherwise significantly move, during operation of the braking system 50 as a result of actuation of the actuator 80. Thus, while movable rod 90 translates based on such actuation, fixed rod 100 does not. As illustrated, fixed rod 100 may be coupled to the actuator 80, such as via a flange of a strut assembly as discussed herein.

A dead lever 110 may be provided in the braking system 50 to transmit the linear force from the actuator 80 and movable rod 90 to the brake assemblies 52, 54. In exemplary embodiments, lever 110 may be disposed proximate the first brake assembly 52 (generally opposite the actuator 80 along the longitudinal axis L). For example, in exemplary embodiments as discussed, first brake assembly 52 may include a compression bar 64 and a tension bar assembly 60. Lever 110 may be disposed within the first brake assembly 52, such as in these embodiments between the compression bar 64 and the tension bar assembly 60.

Lever 110 may include a first end 112, a second end 114, and a pivot point 116. Pivot point 116 is generally disposed between the first end 112 and the second end 114. Further, lever 110 may couple the rods 90, 100 together. For example, movable rod 90, such as the first end 92 thereof, may be connected to the first end 112 of the lever 110 (such as via a suitable mechanical connection, etc.). Fixed rod 100, such as the first end 102 thereof, may similarly be connected to the second end 114 of the lever 110.

A live lever 120 may additionally be provided in the braking system 50 to transmit the linear force from the actuator 80 and movable rod 90 to the brake assemblies 52, 54. In exemplary embodiments, lever 120 may be disposed proximate the second brake assembly 52 (generally opposite the dead lever 110 along the longitudinal axis L). For example, in exemplary embodiments as discussed, second brake assembly 54 may include a compression bar 74 and a tension bar assembly 70. Lever 120 may be disposed within the second brake assembly 54, such as in these embodiments between the compression bar 74 and the tension bar assembly 70.

Lever 120 may include a first end 122, a second end 124, and a pivot point 126. Pivot point 126 is generally disposed between the first end 122 and the second end 124. Further, lever 110 may indirectly couple the rods 90, 100 together via the actuator 80. For example, movable rod 90, such as the second end 94 thereof, may be connected to the second end 124 of the lever 120 (such as via a suitable mechanical connection, etc.). Actuator 80 may be connected to the first end 122 of the lever 120, such as via a flange of a strut assembly as discussed herein.

Notably, distances may be defined between the first and second points of each lever and the pivot points of those levers. For example, a maximum distance 113 may be defined between the first end 112 and pivot point 116, a maximum distance 115 may be defined between the second end 114 and pivot point 116, a maximum distance 123 may be defined between the first end 122 and pivot point 126, a maximum distance 125 may be defined between the second end 124 and pivot point 126. In some embodiments, a maximum distance 113 and maximum distance 115 may be equal. Alternatively, a maximum distance 115 may be greater than a maximum distance 113 as shown, or a maximum distance 113 may be greater than a maximum distance 115. Similarly, in some embodiments, a maximum distance 123 and maximum distance 125 may be equal. Alternatively, a maximum distance 125 may be greater than a maximum distance 123 as shown, or a maximum distance 123 may be greater than a maximum distance 125. Differences in maximum distances may advantageously provide lever differentials which provide desired braking forces.

Movement of the levers 110, 120 based on actuation of the actuator 80 may generally cause movement of the brake assemblies 52, 54 to cause braking operations as discussed above. For example, and notably, actuation of the actuator 80 causes rotation of the live lever 120 about the pivot point 126. Specifically, the first end 122 may rotate due to actuation of the actuator 80, and may cause rotation of the second end 124. This movement of the second end 124 causes translation of the movable rod 90 but no movement of the fixed rod 100. Further, movable rod 90 and fixed rod 100 are both connected to the lever 110 at the ends 112, 114 of the lever 110. As a result, and as illustrated, translation of the movable rod 90 along the longitudinal axis L causes translation of the first end 112 and the pivot point 116 along the longitudinal axis L and rotation of the first end 112 and the pivot point 116 about the second end 114. Second end 114, due to the connection to the fixed rod 100, remains stationary. Such movement of the first end 112 and pivot point 116, however, generally causes a distance 118 along the longitudinal axis L between the first brake assembly 52 and the second brake assembly 54 to change, with an increase in the distance 118 resulting in contact with the wheels 12, 18 and resulting braking and a decrease in the distance 118 resulting in ceasing of contact and braking operations.

FIG. 2 illustrates the braking system 50 in a non-deployed position, with the actuator 80, in this case an air bag, not actuated. FIG. 3 illustrates the braking system 50 in a deployed position after actuation of the air bag.

To facilitate the movement of the first and second brake assemblies 52, 54 along the longitudinal axis L, the various components of the system 50 must be connected to the brake assemblies 52, 54. For example, braking system 50 may include a strut assembly 200 which is disposed proximate the second brake assembly 54, such as between the tension bar assembly 70 and the compression bar 74. Strut assembly 200 may, for example, be connected to the second brake assembly 54, such as to the tension bar assembly 70 and/or compression bar 74 as illustrated. Actuator 80, fixed rod 100 (such as second end 104), and live lever 120 may be connected to components of the strut assembly 200, and fixed rod 100. Accordingly, strut assembly 200 may facilitate the transfer of braking force to the second brake assembly 54. Exemplary embodiments of strut assembly 200 will be discussed in detail herein.

Braking system 50 may further include a slack adjuster 130. Slack adjuster 130 may be disposed proximate the first brake assembly 52, such as between the tension bar assembly 60 and the compression bar 64. Slack adjuster 130 may, for example, be connected to the first brake assembly 52, such as to the tension bar assembly 60 and/or compression bar 64 as illustrated. Further, and critically, the slack adjuster 130 may be connected to the lever 110, such as to the pivot point 116 as illustrated.

In addition to transmitting the braking force from the rods 90, 100 and levers 110, 120 to the first brake assembly 52, slack adjuster 130 may additionally generally adjust the distance 118 to account for wear in the system 50, such as in the brake heads 56, 66 and specifically the pads thereof. For example, as mentioned, FIG. 3 illustrates the braking system 50 in a deployed position after actuation of the air bag. In FIG. 3, the slack adjuster 130 has not been actuated, because the brake heads 56, 66 generally contact the wheels 12, 18 when the lever 110 is rotated within a first angle range 132, as discussed herein. The first angle range 132 can generally be optimized on a system-by-system basis based on the optimal performance of the actuator 80 and other components of the system 50. After a period of use, however, the brake heads 56, 66, and specifically the brake pads thereof, may wear, thus requiring the brake assemblies 52, 54 to travel further along the longitudinal direction L in order for the brake heads 56, 66 to contact the wheels 12, 18. Accordingly, lever 110 may be required to rotate within a second angle range 134 that is greater than the first angle range 132 for this contact to the made. However, the increased actuation that is required of the actuator 80 to cause this further rotation of the lever 110 may require that the actuator 80 operate outside of its peak performance range, thus causing non-optimal braking. Slack adjuster 130 may adjust the distance 118 to account for this situation, for example increasing the distance 118 such that lever 110 is only required to rotate within the first angle range 132 to facilitate braking despite the brake head 56, 66 wear, etc. FIG. 4, for example, illustrates the brake system 50 in the deployed position and after actuation of the slack adjuster 130, with distance 118 increased relative to FIG. 3 such that the brake heads 56, 66 again generally contact the wheels 12, 18 when the lever 110 is rotated within a first angle range 132.

Figure 5:
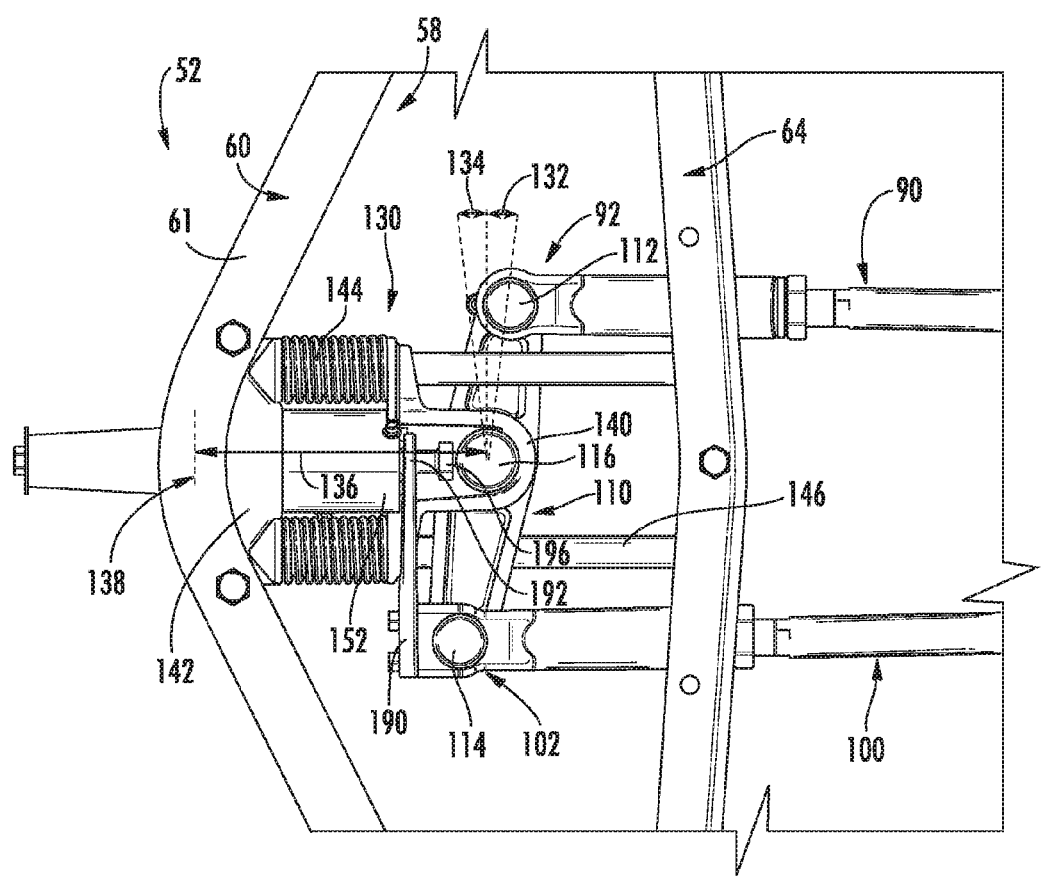
FIG. 5 is a close-up overhead view of a slack adjuster of a braking system with the braking system in an non-deployed position in accordance with one embodiment of the present disclosure.
Figure 6:
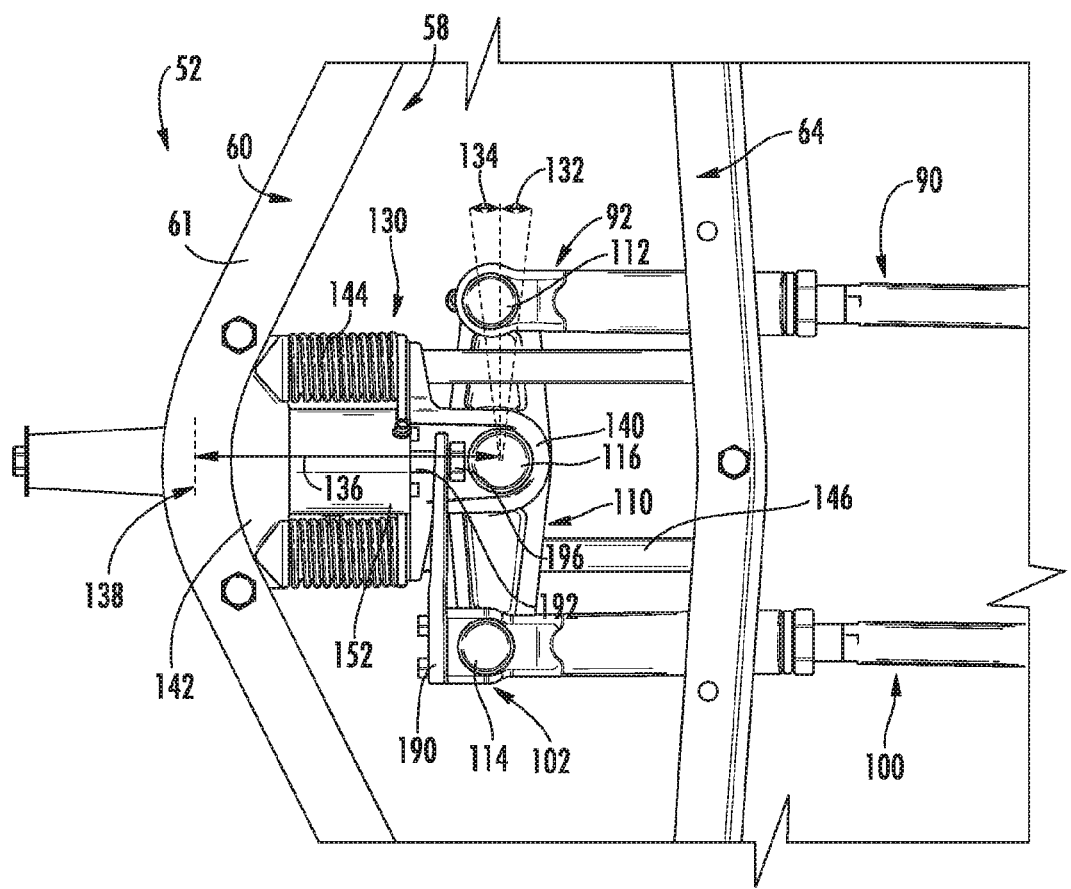
FIG. 6 is a close-up overhead view of the slack adjuster depicted in FIG. 5 with the braking system in a deployed position and the slack adjuster not actuated.
Figure 7:
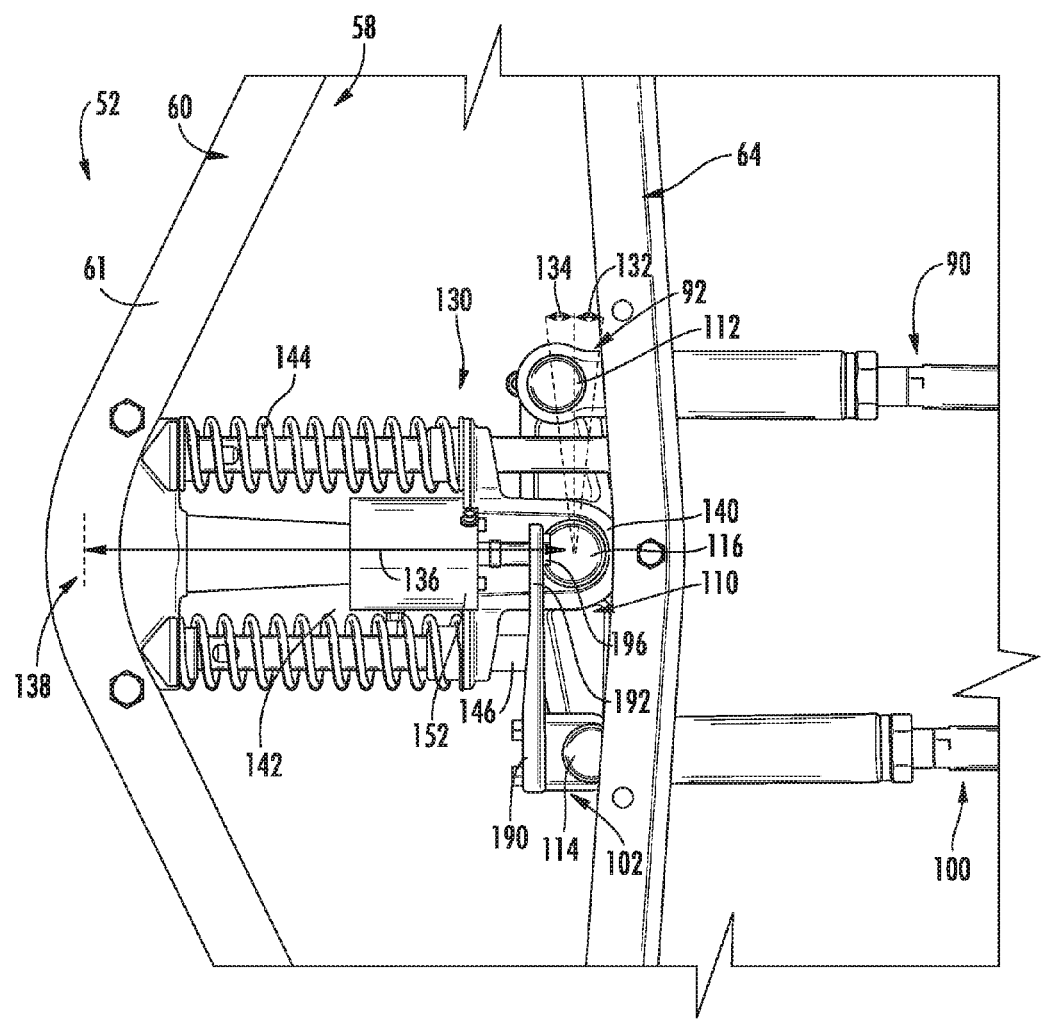
FIG. 7 is a close-up overhead view of the slack adjuster depicted in FIG. 5 with the braking system in a deployed position and the slack adjuster actuated.

Specifically, in the embodiments shown, slack adjuster 130 is advantageously operable to adjust a distance 136 along the longitudinal axis L between a reference point 138 and the pivot point 116. Reference point 138 is defined by and on the bar assembly 58 of the first brake assembly 52. For example, reference point 138 can be defined on the tension bar assembly 60 or the compression bar 64. In the embodiments illustrated, reference point 138 is defined as a central point along the transverse axis T on the tension bar assembly 60, such as on either the first or second tension bar 61, 62. Referring briefly to FIGS. 5 through 7, for example, rotation of the first end 112 about the pivot point 116 within first angle range 132 causes no adjustment of the distance 136 along the longitudinal axis L between the reference point 138 and the pivot point 116. Rotation of the first end 112 about the pivot point 116 within second angle range 134, which is different from and in exemplary embodiments greater than the first angle range 132 causes adjustment of the distance 136 along the longitudinal axis L between the reference point 138 and the pivot point 116. FIG. 5 illustrates slack adjuster 130 in a non-deployed position, with braking system 50 generally also in a non-deployed position. FIG. 6 illustrates braking system 50 actuated to a deployed position, with slack adjuster 130 in a non-deployed position. As illustrated, because first end 112 is within first angle range 132, the slack adjuster 130 has not been actuated. FIG. 7 illustrates braking system 50 actuated to a deployed position, with slack adjuster 130 illustrated after actuation in the deployed position due to rotation of the first end 112 into the second angle range 134. FIG. 4 similarly illustrates slack adjuster 130 after actuation in the deployed position.

The location and operation of slack adjusters 130 as disclosed herein provides numerous advantages. For example, the positioning of the slack adjuster 130 allows both a fixed rod 100 to be utilized, and eliminates the requirement for a slack adjuster incorporated into the fixed rod 100 or movable rod 90. This contributes to the robustness and improved force transmission of brake systems 50 of the present disclosure. Further, slack adjusters 130 positioned in accordance with the present disclosure may advantageously be relatively compact and may thus advantageously decrease the weight of the associated system 50.

Referring now to FIGS. 5 through 13, embodiments of slack adjusters 130 in accordance with the present disclosure will be described in detail. It should be understood, however, that any slack adjuster 130 which is operable to adjust a distance 136 along the longitudinal axis L between a reference point 138 and a pivot point 116 is within the scope and spirit of the present disclosure.

As illustrated, a slack adjuster 130 in accordance with the present disclosure may include a first body 140 connected to the lever 110 at the pivot point 116, and a second body 142 connected to the bar assembly 59. For example, as shown, second body 142 may be connected to the tension bar 60. First body 140 may be translatable relative to the second body 142 along the longitudinal axis L. Further, in exemplary embodiments as illustrated and due to the connections of the first and second bodies 140, 142 as shown, translation of the first body 140 relative to the second body 142 along the longitudinal axis L may adjust the distance 136 along the longitudinal axis L between the reference point 138 and the pivot point 116.

Slack adjuster 130 may further include one or more springs 144 (which may for example be compression springs or other suitable biasing members). Each spring 144 may be operable to bias the first body 140 along the longitudinal axis L, such as relative to (and in exemplary embodiments away from) the second body 142. For example, in embodiments wherein springs 144 are compression springs, the springs 144 may be compressed when the slack adjuster 130 is not deployed. As discussed herein, springs 144 may be held in the compressed position by a ratchet assembly or other suitable actuatable component of the slack adjuster 130. When the slack adjuster 130 is actuated, the springs 144 may be released, and the outward bias of the springs 144 may force the first body 140 away from the second body 142 along the longitudinal axis L, thus deploying the slack adjuster 130.

As shown, slack adjuster 130 may include one or more guide rails 146. The guide rails 146 may extend from the second body 142. First body 140 may be movable connected to the guide rails 146, and may be translatable along the guide rails 146. Further, a spring 144 may be associated with a guide rail 146. For example, a spring 144 may generally surround a guide rail 146 as illustrated. Accordingly, guide rails 146 may generally guide the travel of the springs 144 and the first body 140 relative to the second body 142.

Figure 8:
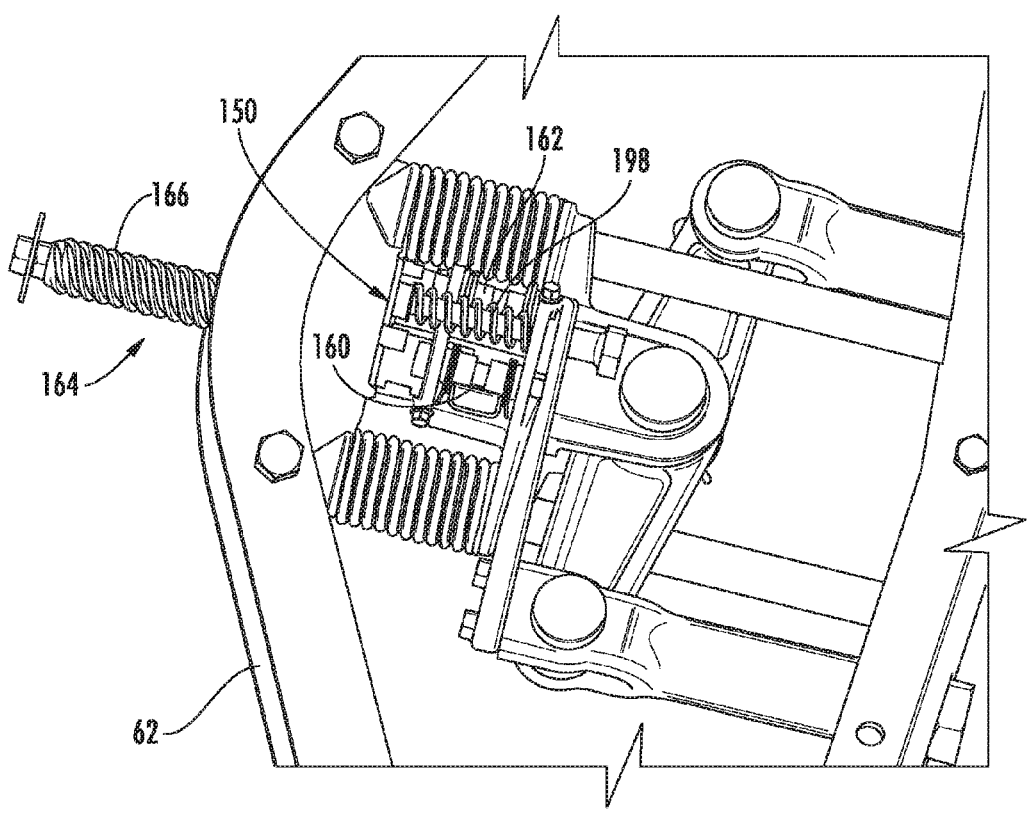
FIG. 8 is a close-up perspective view of a slack adjuster, with a cover removed, in accordance with one embodiment of the present disclosure.
Figure 9:
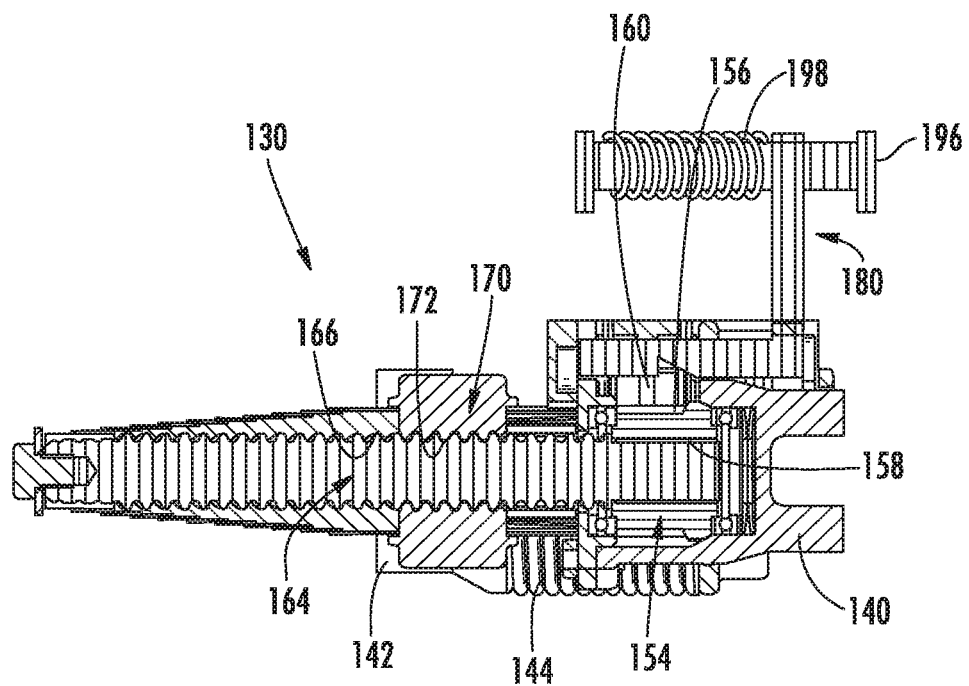
FIG. 9 is a side cross-sectional view of a slack adjuster in accordance with one embodiment of the present disclosure.
Figure 10:
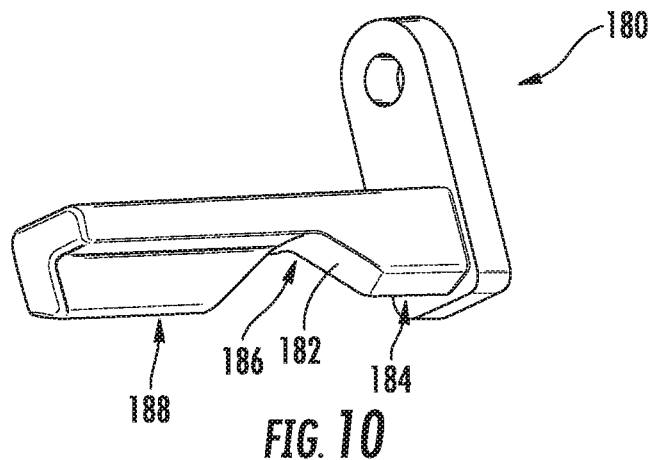
FIG. 10 is a perspective view of a camming bar of a slack adjuster in accordance with one embodiment of the present disclosure.

As mentioned, slack adjuster 130 may further include, for example, a ratchet assembly 150. Ratchet assembly 150 may generally be operable to cause translation of the first body 140 relative to the second body 142. For example, as discussed, rotation of the first end 112 about the pivot point 116 within first angle range 132 causes no actuation of the slack adjuster 130, and thus no adjustment of the distance 136 along the longitudinal axis L between the reference point 138 and the pivot point 116. Rotation of the first end 112 about the pivot point 116 within second angle range 134 causes actuation and deployment of the slack adjuster 130, and thus adjustment of the distance 136 along the longitudinal axis L between the reference point 138 and the pivot point 116. Ratchet assembly 150 may be actuatable to release the springs 144 and cause movement of the first body 140 as discussed above, thus causing actuation and deployment of the slack adjuster 130. FIGS. 8 through 13 illustrate embodiments and components of ratchet assemblies 150 in accordance with the present disclosure. In FIG. 8, a cover 152 of the ratchet assembly 150 has been removed for ease of viewing other components of the ratchet assembly 150.

As illustrated, ratchet assembly 150 can include a rotatable nut 154 and one or more pawls engageable with the nut 154. For example, a first pawl 160 and a second pawl 162 may each be engageable with a plurality of external teeth 156 of the nut 154. Further, a screw rod 164 may be connected, such as threadably connected, to the nut 154. For example, external threads 166 of the screw rod 164 may be threadably connected to internal threads 158 of the rotatable nut 154. Additionally, screw rod 164 may be connected, such as threadably connected, to a fixed nut 170. For example, the external threads 166 may be threadably connected to internal threads 172 of the fixed nut 170. Fixed nut 170 may, for example, be connected to or housed within the second body 142.

Referring briefly to FIGS. 9 and 11 through 13, the pawls 160, 162 may each be rotated between an engaged position wherein the pawl 160, 162 is contacting the plurality of external teeth 156 and a disengaged position wherein the pawl 160, 162 is spaced from the plurality of external teeth 156. When a pawl 160, 162 contacts the external teeth 156, this contact generally prevents rotation of the nut 154, and thus the connected screw rod 164, in a particular direction. Further, when two pawls 160, 162 are utilized as illustrated, the pawls 160, 162 may be positioned such that contact with the external teeth 156 by the first pawl 160 generally prevents rotation of the nut 154 in a first direction and contact with the external teeth 156 by the second pawl 162 generally prevents rotation of the nut 154 in a second opposite direction. The first direction may, for example, be the direction of rotation that the nut 154 and screw rod 164 rotate in as the first body 140 translates away from the second body 142, and the second direction may, for example, be the direction of rotation that the nut 154 and screw rod 164 rotate in as the first body 140 translates towards the second body 142. Such rotation is caused in the first direction by the spring bias and the interaction between the screw rod 164 and fixed nut 170, and this rotation causes translation of the screw rod 164 and rotatable nut 154 with the first body 140 and relative to the fixed nut 170 and second body 142. Rotation in the second opposite direction (and accompanying translation) can be caused manually by an operator resetting the slack adjuster 130, or can alternatively be caused by a suitable selectively actuatable or biasing component.

Figure 11:
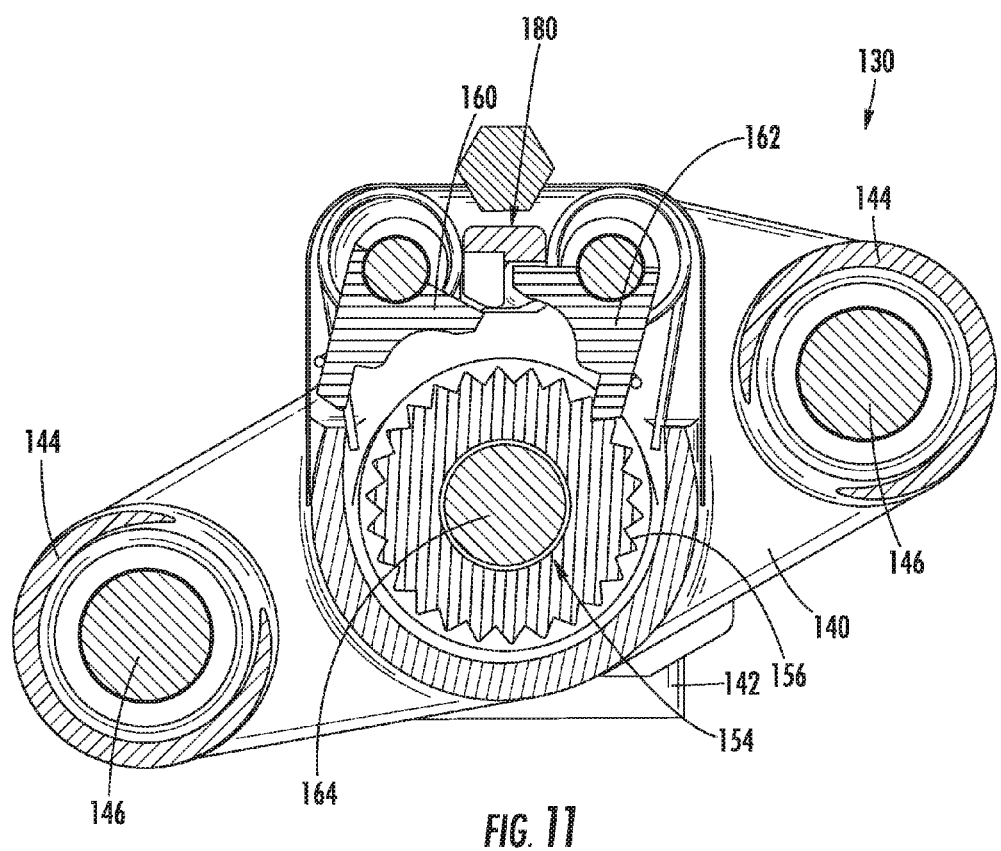
FIG. 11 is a front cross-sectional view of a slack adjuster in accordance with one embodiment of the present disclosure with pawls of the slack adjuster in a first position.
Figure 12:
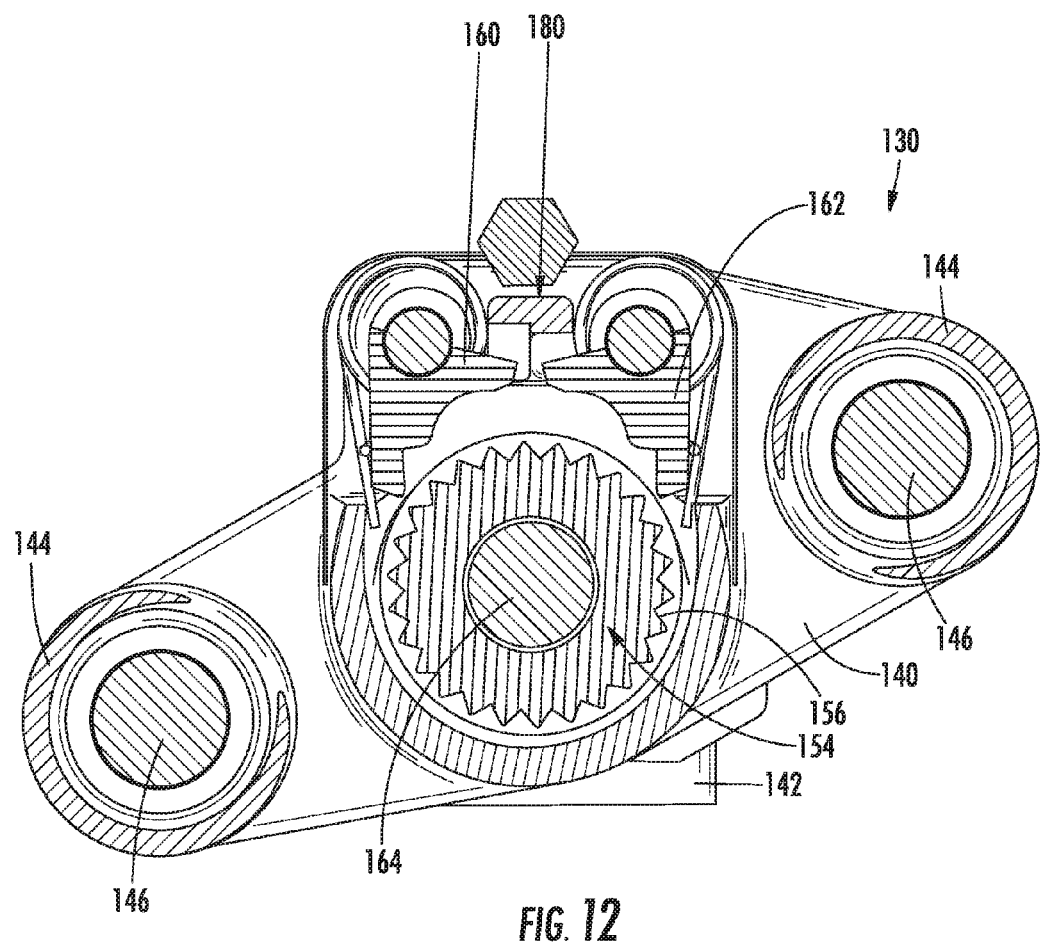
FIG. 12 is a front cross-sectional view of the slack adjuster depicted in FIG. 11 with pawls of the slack adjuster in a second position.
Figure 13:
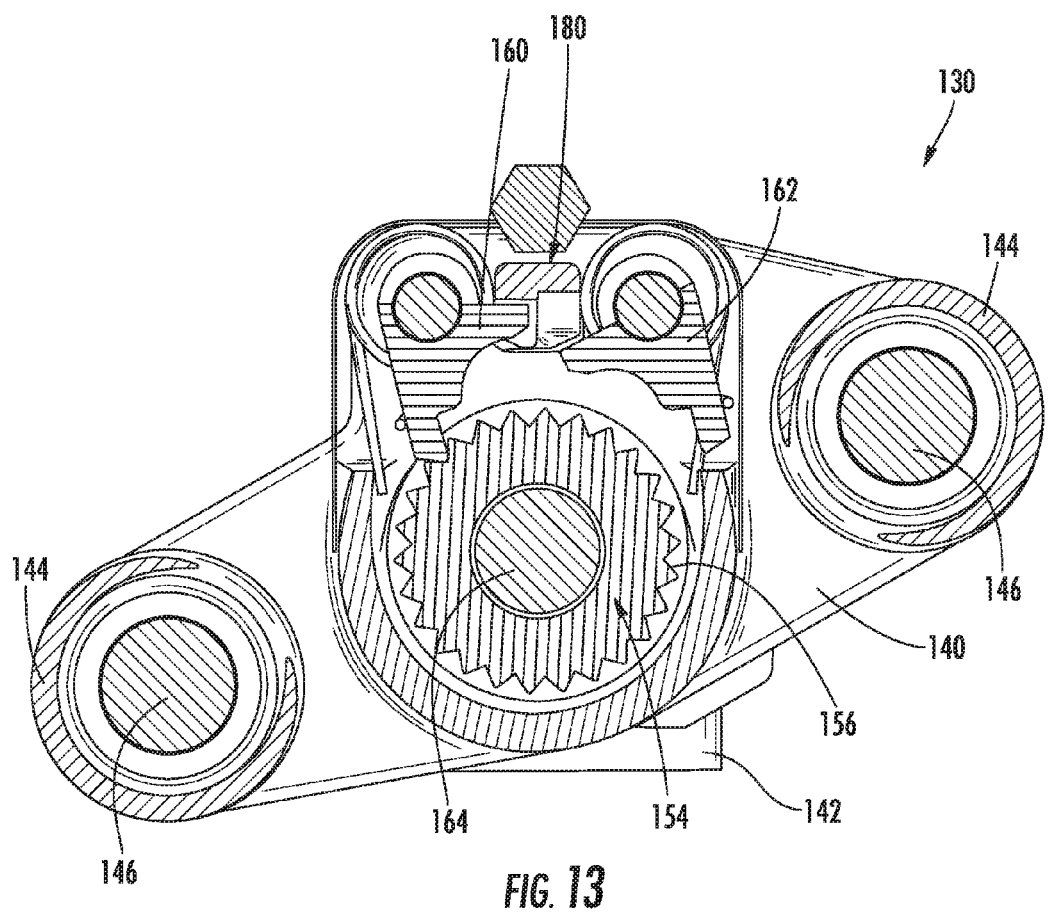
FIG. 13 is a front cross-sectional view of the slack adjuster depicted in FIG. 11 with pawls of the slack adjuster in a third position.
Figure 14:
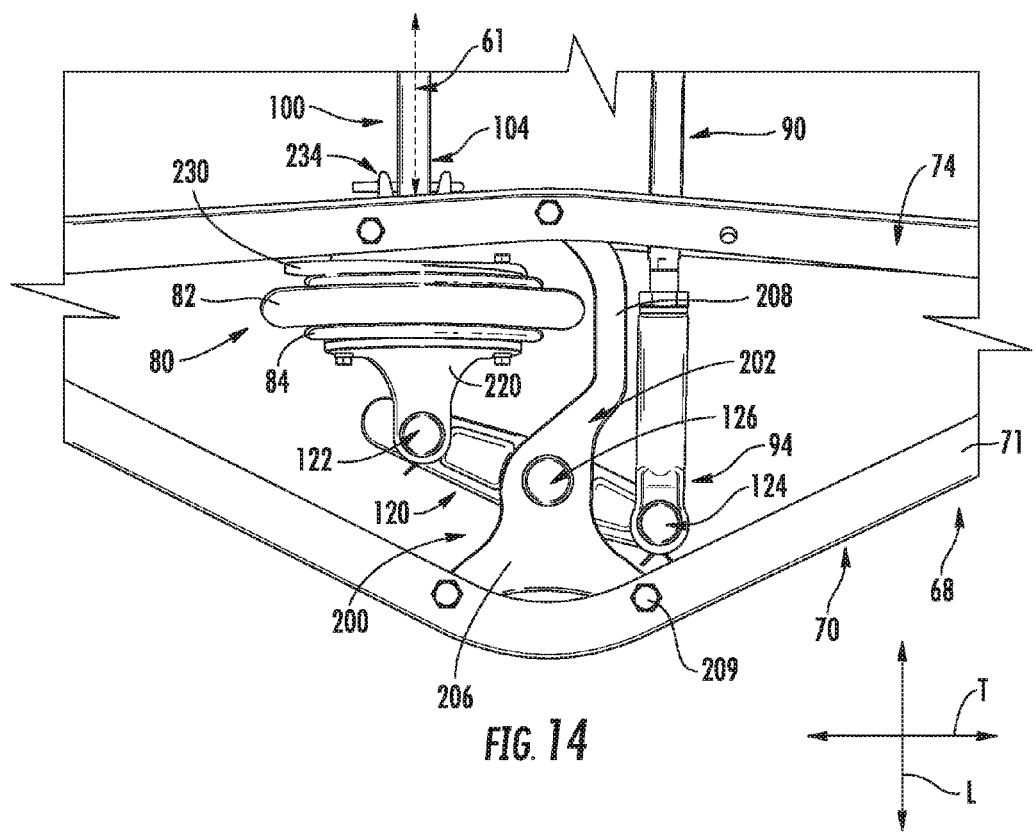
FIG. 14 is an overhead view of a strut assembly shown within a braking system in accordance with one embodiment of the present disclosure.
Figure 15:
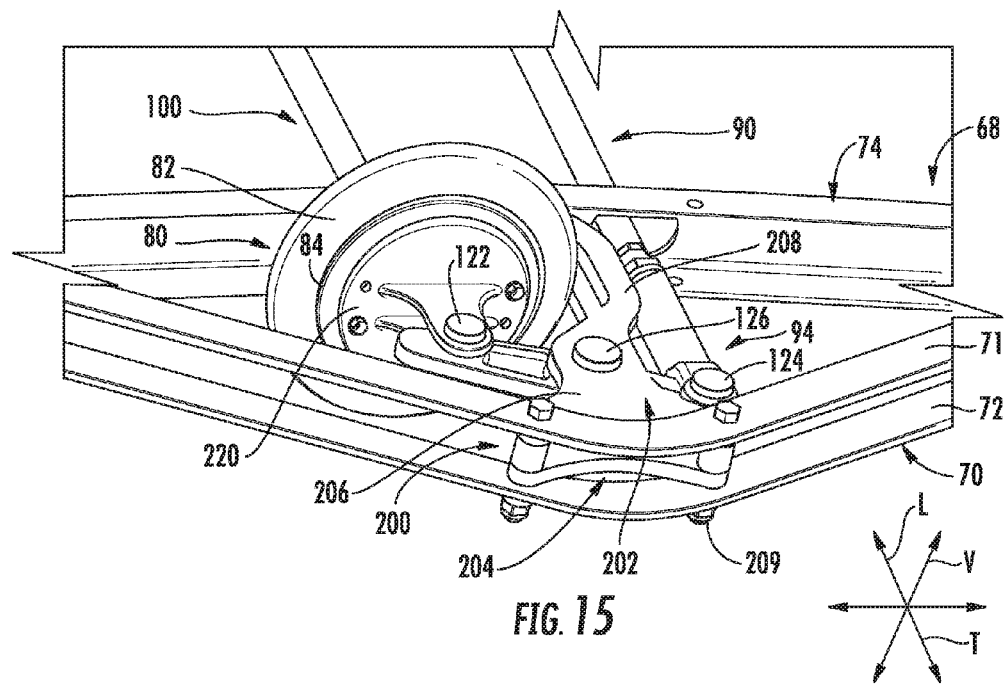
FIG. 15 is a perspective view of the strut assembly depicted in FIG. 14.
Figure 16:
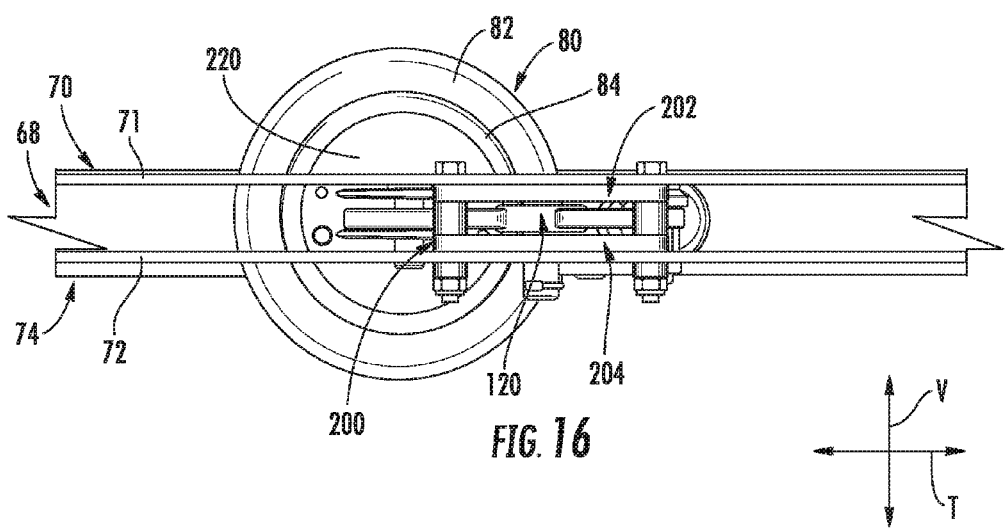
FIG. 16 is a side view of the strut assembly depicted in FIG. 14.
Figure 17:
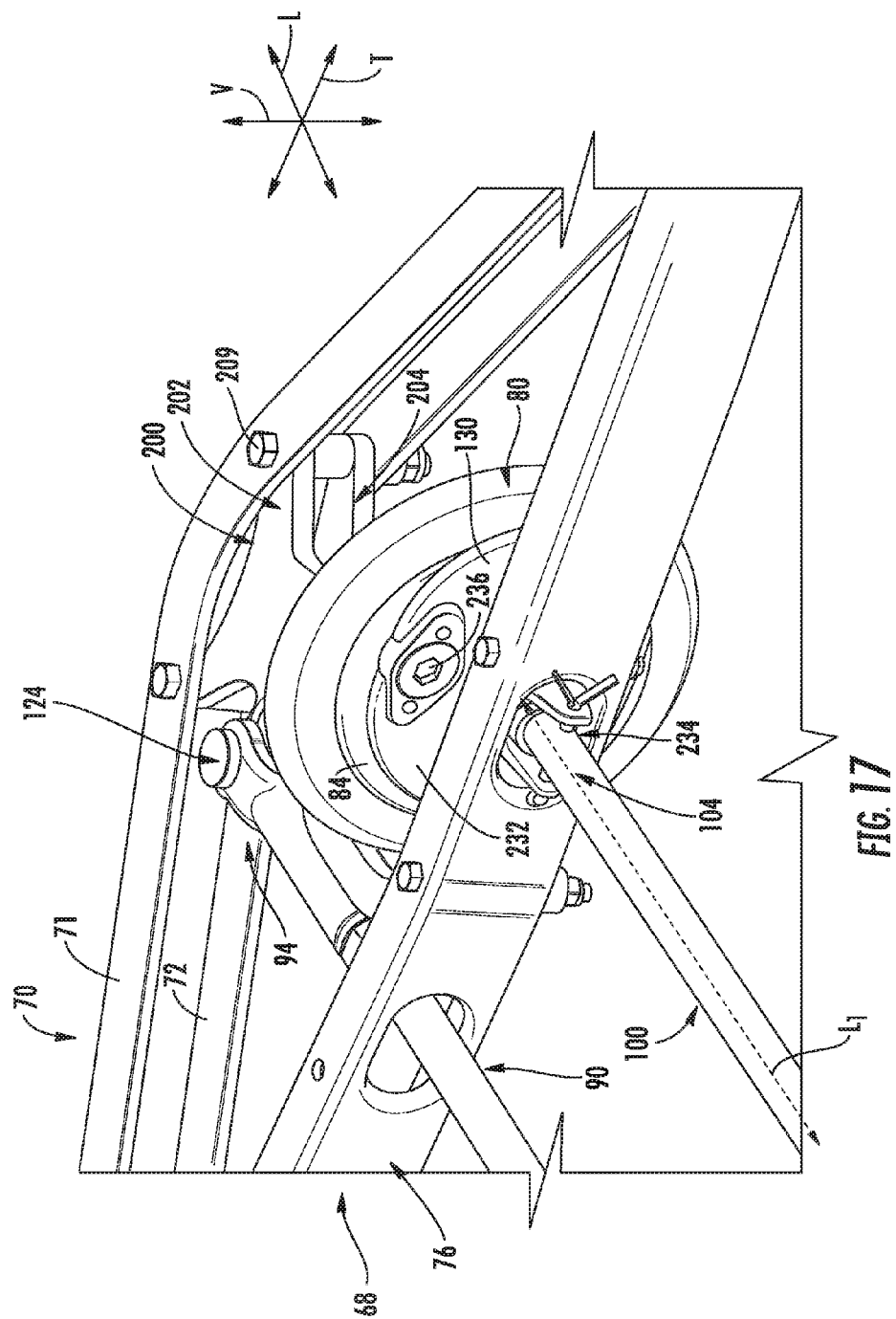
FIG. 17 is another perspective view of the strut assembly depicted in FIG. 14.

FIG. 11 illustrates first pawl 160 in an engaged position and second pawl 162 in a disengaged position. In these positions, the ratchet assembly 150 prevents rotation of the screw rod 164 and rotatable nut 154 in a first direction and thus prevents translation of the first body 140 away from the second body. However, rotation of the screw rod 164 and rotatable nut 154 in a second direction and thus translation of the first body 140 towards the second body is allowed. FIG. 12 illustrates first pawl 160 in a disengaged position and second pawl 162 in a disengaged position. FIG. 13 illustrates first pawl 160 in a disengaged position and second pawl 162 in an engaged position. In both of these positions, the ratchet assembly 150 allows rotation of the screw rod 164 and rotatable nut 154 in a first direction and thus allows translation of the first body 140 away from the second body. In the positions of FIG. 12, the ratchet assembly 150 allows rotation of the screw rod 164 and rotatable nut 154 in a second direction and thus allows translation of the first body 140 towards the second body. In the positions of FIG. 13, the ratchet assembly 150 prevents rotation of the screw rod 164 and rotatable nut 154 in a second direction and thus prevents translation of the first body 140 towards the second body.

Referring again generally to FIGS. 5 through 13, ratchet assembly 150 may further include a camming bar 180. The camming bar 180 may be operable to adjust the positions of the pawls 160, 162, and thus selectively allow translation of the first body 140 relative to the second body 142 as discussed above. For example, camming bar 180, such as a cam surface 182 thereof, may be in contact with the pawls 160, 162. With respect to the first pawl 160, camming bar 180 may be translatable between an engaged position wherein the pawl 160 is rotated into contact with one of the plurality of external teeth 156 and a disengaged position wherein the pawl 160 is rotated into a position spaced from the plurality of external teeth 156. Interaction with the cam surface 182 may cause such rotation. With respect to the second pawl 162, camming bar 180 may be translatable between an engaged position wherein the pawl 162 is rotated into contact with one of the plurality of external teeth 156 and a disengaged position wherein the pawl 162 is rotated into a position spaced from the plurality of external teeth 156. Interaction with the cam surface 182 may cause such rotation. Cam surface 182 may, for example, include two or more portions, such as three portions as illustrated, which may each when in contact with the pawls 160, 162 rotate the pawls 160, 162 to the various positions. For example, first portion 184 may cause the first pawl 160 to be in contact with the teeth 156 and second pawl 162 to be spaced from the teeth 156, second portion 186 may cause the first pawl 160 to be spaced from the teeth 156 and second pawl 162 to be spaced from the teeth 156, and third portion 186 may cause the first pawl 160 to be spaced from the teeth 156 and second pawl 162 to be in contact with the teeth 156. With respect to the first pawl 160, camming bar 180 is in the engaged position when the first portion 184 contacts the pawl 160 and the disengaged position when the second or third portions 186, 188 contact the pawl 160. Accordingly, when the camming bar 180 is in the disengaged position with respect to the first pawl 160, the spring bias can cause the first body 140 to translate away from the second body 142. With respect to the second pawl 162, camming bar 180 is in the engaged position when the third portion 188 contacts the pawl 162 and the disengaged position when the second or first portions 186, 184 contact the pawl 162.

As discussed, camming bar 180 can be translatable between various positions to facilitate operation of the slack adjuster 130 generally. This translation is generally based on rotation of the lever 110. For example, rotation of the first end 112 about the pivot point 116 within first angle range 132 can cause the camming bar 180 to remain in a position such that the first pawl 160 is in an engaged position. Rotation of the first end 112 about the pivot point 116 within second angle range 134, however, can cause the camming bar 180 to translate to a position such that the first pawl 160 is in a disengaged position. In some embodiments as illustrated, ratchet assembly 150 can further include a control rod 190, which can be coupled to the camming bar 180 and which can cause such translation of the camming bar 180. For example, translation of the control rod 190 can cause translation of the camming bar 180.

Referring specifically to FIGS. 5 through 7, one embodiment of the control rod 190 interaction with the camming bar 180 is provided. As illustrated, the control rod 190 may be coupled to fixed rod. The control rod 190 may further include a coupling point 192 which may be movably coupled to the camming bar 180. During rotation of the first end 112 of the lever 110 about the pivot point 116 with the first angle range 132, the camming bar 180 (together with the pawls 160, 162, etc.) may translate relative to the control rod 190 and coupling point 192 thereof, which may remain stationary in terms of translation relative to camming bar 180. Accordingly, camming bar 180 may also remain stationary in terms of translation relative to the pawls 160, 162. During rotation of the first end 112 of the lever 110 about the pivot point 116 with the second angle range 134, a stop 196 of the camming bar 180 may during translation encounter the coupling point 192 of the control rod 190. Due to this contact with the stop 196, continued translation of the camming bar 180 may be stopped, and the pawls 160, 162 may continue to translate relative to the camming bar 180. Accordingly, camming bar 180 may translate relative to the pawls 160, 162, and the slack adjuster 130 may be actuated.

Additionally, ratchet assembly 150 may include a control spring 198. This spring may interact with the camming bar 180 and control rod 190 and may, as illustrated, provide a spring bias to the camming bar 180 and control rod 190, such as in the first direction of travel of the first body 140 away from the second body 142.

It should be understood that the present disclosure is not limited to the ratchet assemblies 150, slack adjusters 130, etc. described herein, and rather that any suitable components for adjusting the distances with braking systems 50 as discussed herein are within the scope and spirit of the present disclosure.

As discussed above, braking system 50 may include a strut assembly 200. Referring now to FIGS. 14 through 19, embodiments of a strut assembly 200 in accordance with the present disclosure are provided. The use of assemblies 200 in accordance with the present disclosure may provide the braking system 50 with various advantages. For example, strut assembly 200 can provide generally even transmission of force to the second brake assembly 54 (about the longitudinal axis), and can linearly orient the rods to facilitate improved force transmission and reduce bending moments, etc., on the rods 90, 100 caused by the linear force generated by the actuator 80.

As discussed, strut assembly 200 can be disposed proximate the second brake assembly 54, such as between the tension bar assembly 70 and the compression bar 74. Strut assembly 200 may, for example, be connected to the second brake assembly 54, such as to the tension bar assembly 70 and/or compression bar 74 as illustrated. Actuator 80 may be connected to the strut assembly 200, and fixed rod 100, movable rod 90 (such as the second ends 104, 94 thereof), and live lever 120, may further be connected to the strut assembly 200.

In exemplary embodiments, as illustrated, strut assembly 200 includes a first strut member 202 and a second strut member 204. The second strut member 204 may be spaced apart from the first strut member 202. As shown, no intermediate bars or members may directly connect the first and second strut members 202, 204. In exemplary embodiments, the first and second strut members 202, 204 may be generally flat members, as shown.

Each strut member 202, 204 may include a base 206 and an arm 208 which extends from the base 206. The base 206 of each strut member 202, 204 may, for example, be connected to the tension bar assembly 70, such as to the first tension bar 71 and second tension bar 72. Mechanical fasteners 209 (which in exemplary embodiments may be nut/bolt combinations but alternatively may be screws, nails, rivets, etc.) may, for example, extend through the bases 206 and tension bars 71, 72 to connect these components together. In exemplary embodiments as shown, the bases 206 may be generally centered relative to the tension bar assembly 70 along the transverse direction T to facilitate even force distribution. Further, in exemplary embodiments, the bases 206 may be connected to the tension bar assembly 70 at two or more locations, as shown.

The arm 208 of each strut member 202, 205 may, for example, be connected to the compression bar 74. Mechanical fasteners 209 may, for example, extend through the arms 208 and compression bar 74 to connect these components together. In exemplary embodiments, the location of connection of the arms 208 with the compression bar 74 may be generally centered relative to the tension bar assembly 70 along the transverse direction T to facilitate even force distribution. In some embodiments, each arm 208 may include a curvilinear and/or offset (along transverse axis T) portion which facilitates accommodation of the actuator 80 as shown.

In exemplary embodiments as shown, the live lever 120 may be coupled to the strut assembly 200. Specifically, the pivot point 126 may be coupled to the strut assembly 200 (i.e. via a mechanical fastener 209), such as to the first and second strut members 202, 204. In exemplary embodiments as shown, the live lever 120 may be disposed between the first strut member 202 and the second strut member 204 along the vertical axis V, as shown.

Figure 18:
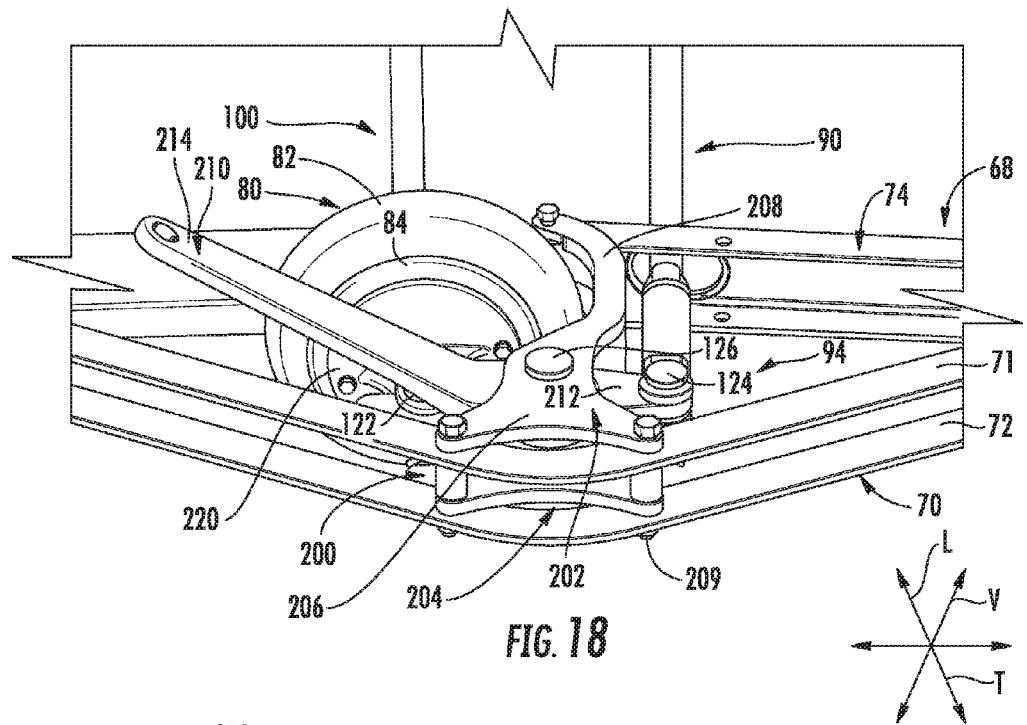
FIG. 18 is a perspective view of a strut assembly shown within a braking system in accordance with another embodiment of the present disclosure.
Figure 19:
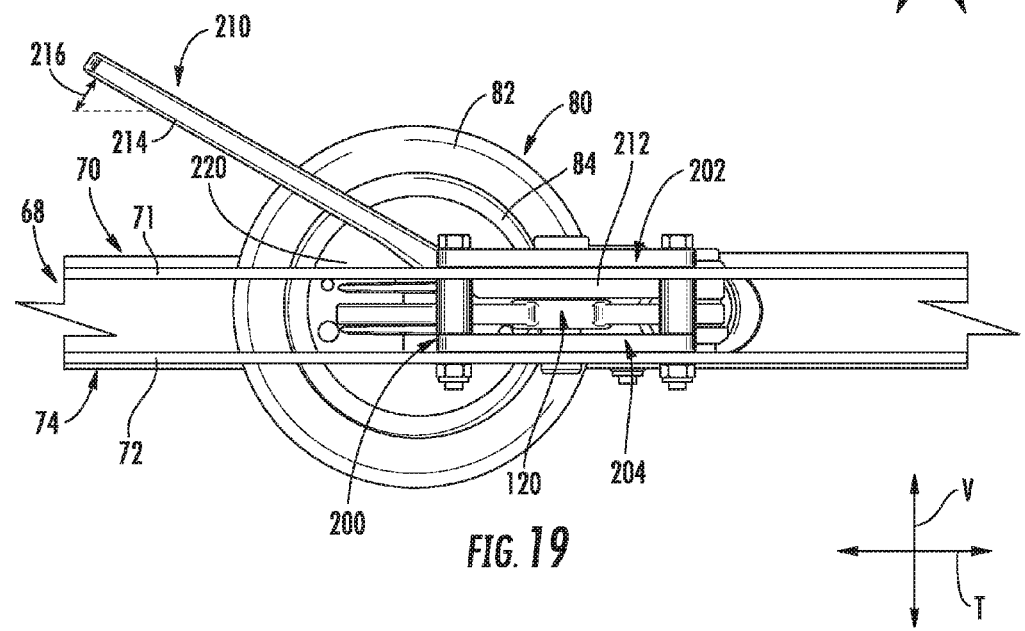
FIG. 19 is a side view of the strut assembly depicted in FIG. 18.

Referring now to FIGS. 18 and 19, in some embodiments the system 50 may further include a hand brake lever 210. The hand brake lever 210 may facilitate manual activation of the system 50 through movement of the hand brake lever 210, which may cause translation of the movable rod 90. Hand brake lever 210 may, for example, include a base 212 and an arm 214 extending therefrom. In exemplary embodiments as illustrated, the base 212 may be disposed between the first strut member 202 and the second strut member 204, as shown. The hand brake lever 210, such as the base 212 thereof, may be coupled to the pivot point 126 of the live lever 120 and connected to the movable rod 90, such as the second end 94 thereof. To actuate the hand brake lever 210, hand brake lever 210 may be manually moved, such as by rotating the arm 214. Such movement may cause movement, such as rotation, of the base 212, which in turn may cause translation of the movable rod 90. Subsequent movements of the various components of the system 50 as discussed herein may result from such movement of the movable rod 90.

The arm 214 may extend from the base 212 at a suitable angle 216 to facilitate ease of access. For example, the arm 214 may extend at an angle (to the longitudinal axis L-transverse axis T plane) of between 20 degrees and 50 degrees, such as between 25 degrees and 40 degrees, such as approximately 30 degrees.

In some embodiments, as illustrated in FIGS. 14 through 17, the live lever 120, the first strut member 202 and the second strut member 204 are disposed between the first tension bar 71 and the second tension bar 72 along the vertical axis V. Alternatively and in particular when a hand brake lever 210 is utilized, the live lever 120 and only one of the first strut member 202 or second strut member 204 are disposed between the first tension bar 71 and the second tension bar 72 along the vertical axis V. Notably and advantageously, however, the same components may be utilized in both hand brake and non-hand brake embodiments, with the relative positioning along the vertical axis V modified in hand brake embodiments. Referring again to FIGS. 14 through 19, a flange 220, such as a first flange, may be connected to and between the live lever 120, such as the first end 122 thereof, and the actuator 80. Flange 220 may thus provide the connection between these components. The flange 220 may in exemplary embodiments define a first central longitudinal axis C1 which, when the braking system 50 is assembled, may be generally parallel to the longitudinal axis L. In exemplary embodiments, the actuator 80 may be centrally aligned on the central longitudinal axis C1 such that the linear force generated by the actuator 80 is generated along the central longitudinal axis C1. Notably, the flange 220 may include a variety of different mounting bore holes defined therein to facilitate a connection between the flange 220 and various sizes of actuators 80, while allowing each sized actuator 80 to be desirably centrally aligned.

Strut assembly 200 may further include a second flange 230. Second flange 230 may similarly be connectable to the actuator 80 such that, when assembled as illustrated, the actuator 80 may be connected to the flange 230. Accordingly, actuator 80 may be connectable and, when assembled, connected between the first flange 220 and the second flange 230.

Second flange 230 may include a body 232 and a pocket 234 defined in the body 232. To connect the fixed rod 100 to the assembly 200, the second end 104 of the fixed rod 100 may be, when assembled, disposed within the pocket 234. Accordingly, pocket 234 may be sized to receive the fixed rod 100, such as the second end 104 thereof, therein. Further, advantageously, the pocket 234 may be centrally located on the body 232. In exemplary embodiments as illustrated the second flange 230 generally and/or the pocket 234 thereof may be centrally aligned on the central longitudinal axis C1. Accordingly, the linear force generated by the actuator 80 may be generated along the central longitudinal axis C1 centrally through the second flange 230 generally and/or the pocket 234 thereof. Fixed rod 100 may further extend along the central longitudinal axis C1 and, because fixed rod 100 is connected to the pocket 234 in these embodiments, the linear force can thus advantageously be transmitted linearly through the fixed rod 100.

Further, in exemplary embodiments as shown, flange 230 may include a passage 236 defined in and through the body 232. Passage 236 may allow for an actuation source, such as in the case of an air bag an air hose (not shown) to connect through the flange 230 to the actuator 80.

Figure 20:
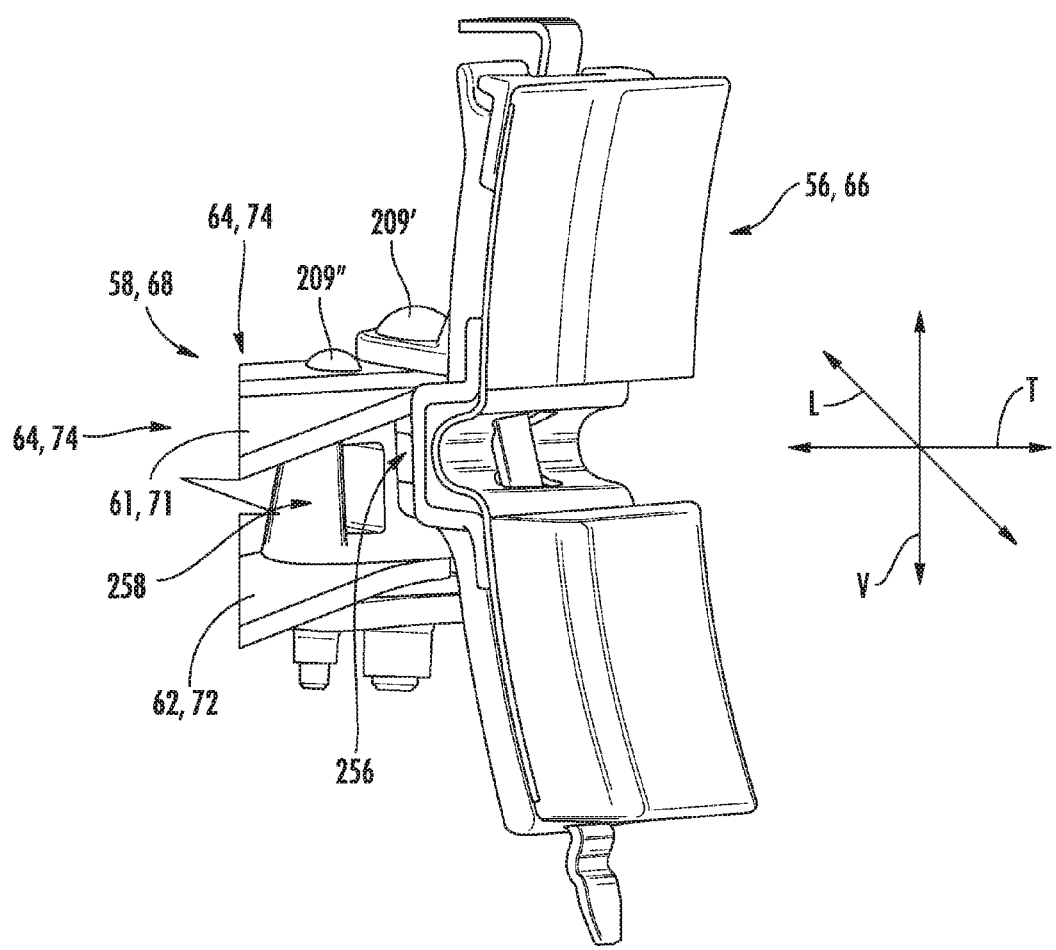
FIG. 20 is a perspective view of a portion of a brake assembly, including a brake head and an end extension, in accordance with one embodiment of the present disclosure.
Figure 21:
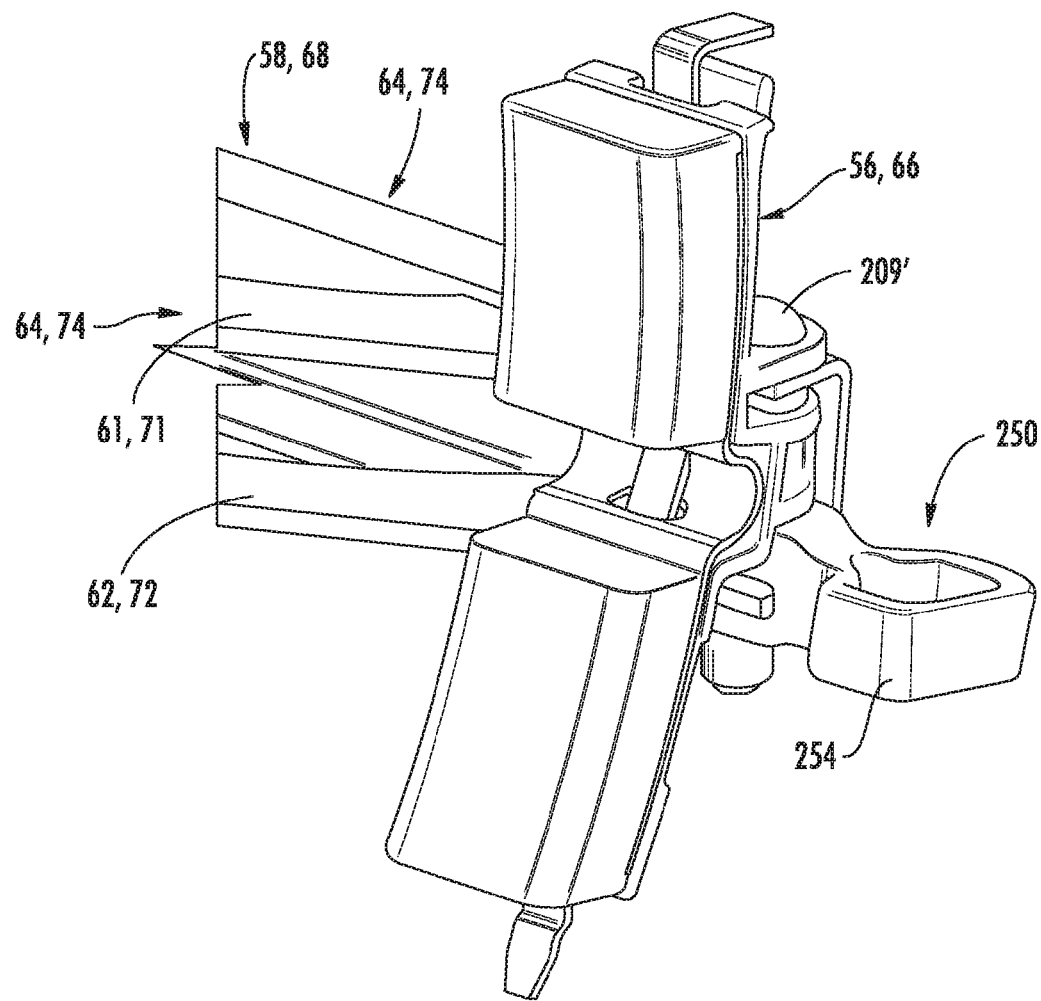
FIG. 21 is another perspective view of the portion of the brake assembly depicted in FIG. 20.
Figure 22:
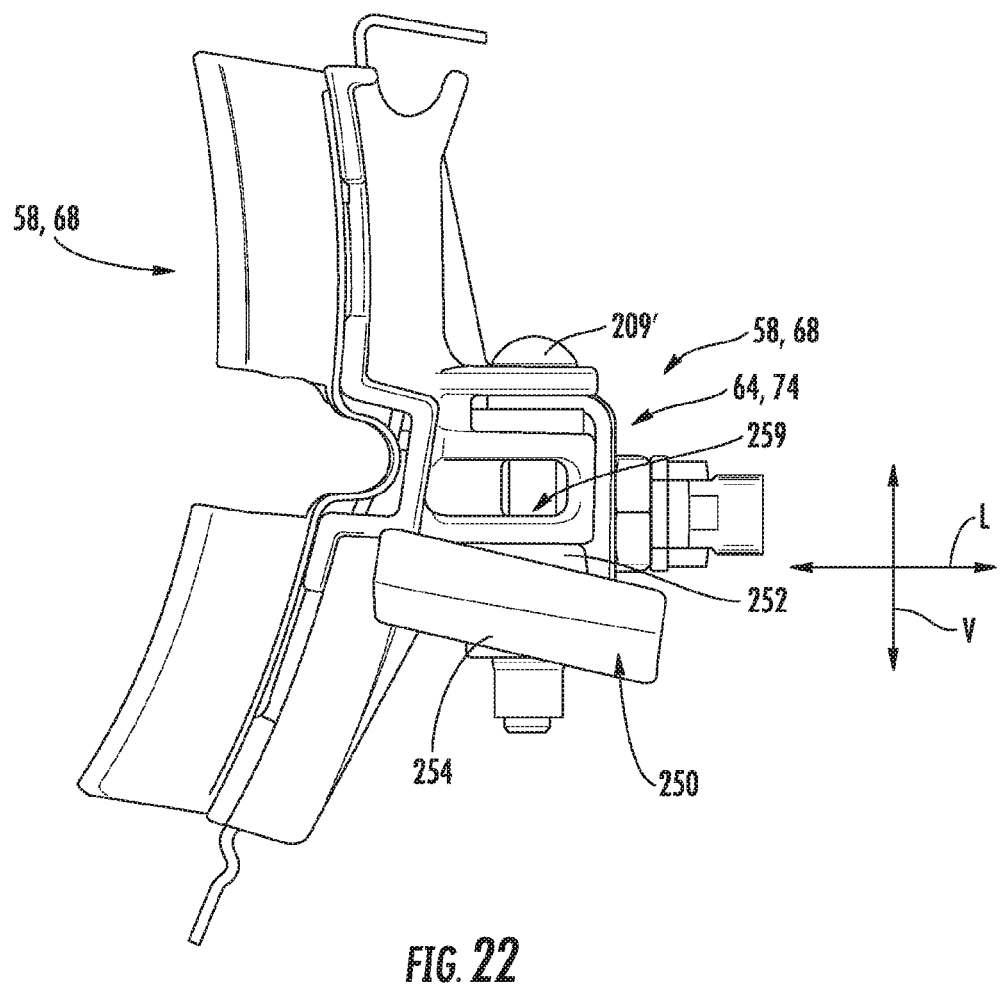
FIG. 22 is a side view of the portion of the brake assembly depicted in FIG. 20.

Referring now to FIGS. 20 through 22, a braking system 50 may further include a plurality of end extensions 250. For example, each brake assembly 52, 54 may include a plurality of end extensions 250. Each end extension 250 may be connected to a bar assembly 58, 68, such as proximate a brake head 56, 66. Further, each end extension 250 may be connected to a brake head 56, 66. The end extensions 250 generally provide interfaces for supporting the braking system 50 on the chassis 24. Specifically, the end extensions 250 contact the chassis 24 and support the braking system 50 relative to the chassis 24.

As illustrated, each end extension 250 may include a connector body 252 and a support body 254. In exemplary embodiments as shown the connector body 252 and support body 254 are integral with each other, and thus integrally formed as a single, monolithic component. In general, the connector body 252 may connect the end extension 250 to other components of the braking system 50, and the support body 254 extends from the connector body 252 and provides the interface with the chassis 24.

For example, each end extension 250 (such as the connector body 252 thereof) in exemplary embodiments may be connected at a first connection point 256 (such as via a mechanical fastener 209) to an associated brake head 56, 66 and bar assembly 58, 68 (i.e. the compression bar 64, 74 and/or tension bar assembly 60, 70 thereof). For example, a first mechanical fastener 209' may extend through the end extension 250 (such as the connector body 252 thereof) and the associated brake head 56, 66 and bar assembly 58, 68 at the first connection point 256 to connect these components together.

Further, each end extension 250 (such as the connector body 252 thereof) in exemplary embodiments may be connected at a second connection point 258 (such as via a mechanical fastener 209) to an associated bar assembly 58, 68 (i.e. the compression bar 64, 74 and/or tension bar assembly 60, 70 thereof). For example, a second mechanical fastener 209" may extend through the end extension 250 (such as the connector body 252 thereof) and the associated bar assembly 58, 68 at the second connection point 258 to connect these components together. Notably, however, the end extension 250 may not be connected to an associated brake head 56, 66 at the second connection point 258. For example, the second mechanical fastener 209" may not extend through the associated brake head 56, 66 at the second connection point 258. Such use of the second connection point 258 advantageously allows for the brake heads 56, 66 to be removed (via the first connection point 256, such as by removing the first mechanical fastener 209') for inspection, repair, replacement, etc., while the end extension 250 and the associated bar assembly 58, 68 remain connected at the second connection point 258 (such as via the second mechanical fastener 209"). Accordingly, entire disassembly of these components is not required for inspection, repair, replacement, etc. of the brake heads 56, 66.

The end extensions 250 may, in exemplary embodiments, position various other components of the braking system 50 in advantageous relative locations along the vertical axis V. Such positioning may facilitate improved access to the braking system 50 and improved braking operation due to reduced wear to the brake heads 56, 66.

For example, in some embodiments as shown, the support body 254 (i.e. a midpoint thereof along the vertical axis V) of each end extension 250 may be offset from a midpoint 259 of the associated bar assembly 58, 68 along the vertical axis V. As shown, in exemplary embodiments, each support body 254 may be below the midpoint 259 along the vertical axis V. Such positioning may advantageously raise the remaining components of the braking system 50 relative to the chassis 24. Additionally or alternatively, in some embodiments as shown, each support body 254 may be angled relative to a plane defined by the longitudinal axis L and transvers axis T.

Additionally or alternatively, each brake head 56, 66 may be offset from the associated midpoint 259 along the vertical axis V. For example, in exemplary embodiments as shown, each brake head 56, 66 may be above the associated midpoint 259 along the vertical axis V. Such positioning may advantageously reduce and/or evenly distribute the wear on the brake pads of the brake head 56, 66 may faciliting improved positioning of the brake heads 56, 66 relative to the wheels 12, 18.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A braking system for a railway car, the braking system defining a longitudinal axis and comprising:
    a first brake assembly, the first brake assembly comprising
        a bar assembly and a plurality of brake heads connected to the bar assembly, the bar assembly comprising a tension bar assembly and a compression bar;
a second brake assembly, the second brake assembly comprising a bar assembly and a plurality of brake heads connected to the bar assembly, the bar assembly comprising a tension bar assembly and a compression bar;
an actuator operable to generate a linear force, the actuator disposed between the tension bar assembly and the compression bar of the second brake assembly;
a fixed rod extending between the first brake assembly and the second brake assembly;
a movable rod extending between the first brake assembly and the second brake assembly, the movable rod connected to the actuator and translatable along the longitudinal axis based on operation of the actuator;
a live lever disposed proximate the second brake assembly, the live lever comprising a first end, a second end, and a pivot point between the first end and the second end, the first end connected to the actuator, the second end connected to the movable rod;
a strut assembly disposed between and connected to the tension bar assembly and the compression bar of the second brake assembly, wherein the pivot point of the live lever is coupled to the strut assembly, wherein the strut assembly further comprises a first flange and a second flange, the first flange connected to the first end of the live lever, and wherein the actuator is connected to and between the first flange and the second flange.

2. The braking system of claim 1, wherein the strut assembly comprises a first strut member and a second strut member, the second strut member spaced from the first strut member along a vertical axis.

3. The braking system of claim 2, wherein the live lever is disposed between the first strut member and the second strut member along the vertical axis.

4. The braking system of claim 2, wherein each of the first strut member and the second strut member comprises a base connected to the tension bar assembly and an arm connected to the compression bar.

5. The braking system of claim 1, wherein each tension bar assembly comprises a first tension bar and a second tension bar spaced apart from the first tension bar along a vertical axis.

6. The braking system of claim 5, wherein the live lever and a first strut member and second strut member of the strut assembly are disposed between the first tension bar and the second tension bar of the second brake assembly along the vertical axis.

7. The braking system of claim 1, further comprising a hand brake lever, the hand brake lever comprising a base and an arm extending from the base, the hand brake lever coupled to the pivot point of the live lever and connected to the movable rod.

8. The braking system of claim 7, wherein the arm extends from the base at an angle of between 20 degrees and 50 degrees.

9. The braking system of claim 7, wherein the strut assembly comprises a first strut member and a second strut member, the second strut member spaced from the first strut member along a vertical axis, and wherein the base of the hand brake lever is disposed between the first strut member and the second strut member along the vertical axis.

10. The braking system of claim 1, wherein the second flange comprises a body and a pocket defined in the body, and wherein a second end of the fixed rod is disposed within the pocket.

11. The braking system of claim 1, wherein the second flange comprises a body and a passage defined in the body.

12. The brake system of claim 1, wherein the actuator is an air bag.

13. A braking system for a railway car, the braking system defining a longitudinal axis and comprising:
a first brake assembly, the first brake assembly comprising a bar assembly and a plurality of brake heads connected to the bar assembly, the bar assembly comprising a tension bar assembly and a compression bar, the tension bar assembly comprises a first tension bar and a second tension bar spaced apart from the first tension bar along a vertical axis;
a second brake assembly, the second brake assembly comprising a bar assembly and a plurality of brake heads connected to the bar assembly, the bar assembly comprising a tension bar assembly and a compression bar, the tension bar assembly comprises a first tension bar and a second tension bar spaced apart from the first tension bar along the vertical axis;
an actuator operable to generate a linear force, the actuator disposed between the tension bar assembly and the compression bar of the second brake assembly;
a fixed rod extending between the first brake assembly and the second brake assembly;
a movable rod extending between the first brake assembly and the second brake assembly, the movable rod connected to the actuator and translatable along the longitudinal axis based on operation of the actuator;
a live lever disposed proximate the second brake assembly, the live lever comprising a first end, a second end, and a pivot point between the first end and the second end, the first end connected to the actuator, the second end connected to the movable rod;
a strut assembly disposed between and connected to the tension bar assembly and the compression bar of the second brake assembly, the strut assembly comprising a first strut member and a second strut member, the second strut member spaced from the first strut member along the vertical axis, wherein the pivot point of the live lever is coupled to the first strut member and the second strut member, and wherein the live lever is disposed between the first strut member and the second strut member along the vertical axis, wherein the strut assembly further comprises a first flange and a second flange, the first flange connected to the first end of the live lever, and wherein the actuator is connected to and between the first flange and the second flange.

14. The braking system of claim 13, further comprising a hand brake lever, the hand brake lever comprising a base and an arm extending from the base, the hand brake lever coupled to the pivot point of the live lever and connected to the movable rod.

15. The braking system of claim 14, wherein the arm extends from the base at an angle of between 20 degrees and 50 degrees.

16. The braking system of claim 14, wherein the base of the hand brake lever is disposed between the first strut member and the second strut member along the vertical axis.

17. The braking system of claim 13, wherein the live lever, the first strut member and the second strut member are disposed between the first tension bar and the second tension bar of the second brake assembly along the vertical axis.

18. The braking system of claim 13, wherein the actuator is an air bag.

* * * * *